US010038702B2

(12) United States Patent
Thomas et al.

(10) Patent No.: US 10,038,702 B2
(45) Date of Patent: *Jul. 31, 2018

(54) SERVER DRIFT MONITORING

(71) Applicant: Sophos Limited, Abingdon (GB)

(72) Inventors: Andrew J. Thomas, Oxfordshire (GB);
Kenneth D. Ray, Seattle, WA (US);
Mark D. Harris, Oxon (GB)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,501

(22) Filed: Aug. 21, 2017

(65) Prior Publication Data
US 2017/0346835 A1    Nov. 30, 2017

Related U.S. Application Data

(63) Continuation of application No. 14/569,944, filed on Dec. 15, 2014, now Pat. No. 9,774,613.

(51) Int. Cl.
  *H04L 12/26*    (2006.01)
  *G06F 21/00*    (2013.01)
  *H04L 29/06*    (2006.01)
(52) U.S. Cl.
  CPC ........ *H04L 63/1408* (2013.01); *H04L 63/145* (2013.01); *H04L 63/20* (2013.01)
(58) Field of Classification Search
  None
  See application file for complete search history.

(56) References Cited

U.S. PATENT DOCUMENTS 5,919,257 A * 7/1999 Trostle ................. G06F 21/575
                                              726/22
7,310,590 B1   12/2007 Bansal et al.
(Continued)

FOREIGN PATENT DOCUMENTS

GB        2505533        3/2014
WO    WO-2011094746      8/2011
(Continued)

OTHER PUBLICATIONS

Salem, Osman et al., "Anomaly Detection in Network Traffic Using Jensen-Shannon Divergence", IEEE ICC 2012—Wireless Networks Symposium 2012 , pp. 5200-5204.
(Continued)

*Primary Examiner* — Alexander Lagor
(74) *Attorney, Agent, or Firm* — Strategic Patents, P.C.

(57) ABSTRACT

Threat detection is improved by monitoring variations in observable events and correlating these variations to malicious activity. The disclosed techniques can be usefully employed with any attribute or other metric that can be instrumented on an endpoint and tracked over time including observable events such as changes to files, data, software configurations, operating systems, and so forth. Correlations may be based on historical data for a particular machine, or a group of machines such as similarly configured endpoints. Similar inferences of malicious activity can be based on the nature of a variation, including specific patterns of variation known to be associated with malware and any other unexpected patterns that deviate from normal behavior. Embodiments described herein use variations in, e.g., server software updates or URL cache hits on an endpoint, but the techniques are more generally applicable to any endpoint attribute that varies in a manner correlated with malicious activity.

19 Claims, 10 Drawing Sheets

(56) References Cited

U.S. PATENT DOCUMENTS

| | | | |
|---|---|---|---|
| 7,716,274 B1* | 5/2010 | Kumar | G06F 9/461 709/203 |
| 7,725,941 B1 | 5/2010 | Pavlyushchik et al. | |
| 8,260,653 B1 | 9/2012 | Osterfelt et al. | |
| 8,533,818 B1 | 9/2013 | Ketterhagen et al. | |
| 8,566,932 B1 | 10/2013 | Hotta et al. | |
| 8,639,797 B1 | 1/2014 | Sanders et al. | |
| 8,959,633 B1* | 2/2015 | Dokey | G06F 21/50 705/30 |
| 9,405,904 B1 | 8/2016 | Fang et al. | |
| 2001/0008019 A1* | 7/2001 | Vert | G06F 11/1662 714/1 |
| 2002/0099821 A1 | 7/2002 | Hellerstein et al. | |
| 2004/0025044 A1 | 2/2004 | Day et al. | |
| 2004/0037326 A1 | 2/2004 | D'Souza et al. | |
| 2004/0060044 A1 | 3/2004 | Das et al. | |
| 2004/0117667 A1 | 6/2004 | Lavender et al. | |
| 2004/0187133 A1 | 9/2004 | Weisshaar et al. | |
| 2004/0259640 A1 | 12/2004 | Gentles et al. | |
| 2005/0052998 A1 | 3/2005 | Oliver et al. | |
| 2006/0020924 A1 | 1/2006 | Lo et al. | |
| 2006/0037077 A1* | 2/2006 | Gadde | H04L 63/1416 726/23 |
| 2006/0206571 A1 | 9/2006 | Kuwahara et al. | |
| 2006/0253581 A1 | 11/2006 | Dixon et al. | |
| 2006/0276995 A1 | 12/2006 | Breitgand et al. | |
| 2007/0028303 A1* | 2/2007 | Brennan | G06F 21/55 726/24 |
| 2007/0064617 A1 | 3/2007 | Reves et al. | |
| 2007/0118909 A1 | 5/2007 | Hertzog et al. | |
| 2008/0016412 A1 | 1/2008 | White et al. | |
| 2008/0082662 A1 | 4/2008 | Dandliker et al. | |
| 2008/0163380 A1 | 7/2008 | Liu et al. | |
| 2008/0244748 A1 | 10/2008 | Neystadt et al. | |
| 2008/0250497 A1 | 10/2008 | Mullarkey et al. | |
| 2008/0270071 A1 | 10/2008 | Marvasti et al. | |
| 2009/0018983 A1 | 1/2009 | El-Rafei et al. | |
| 2009/0106174 A1 | 4/2009 | Battisha et al. | |
| 2009/0210407 A1 | 8/2009 | Freire et al. | |
| 2009/0248753 A1 | 10/2009 | Tsai et al. | |
| 2010/0188975 A1 | 7/2010 | Raleigh et al. | |
| 2010/0281536 A1 | 11/2010 | Richards et al. | |
| 2011/0055920 A1* | 3/2011 | Hariri | G06F 21/552 726/22 |
| 2011/0067101 A1 | 3/2011 | Seshadri et al. | |
| 2011/0185422 A1 | 7/2011 | Khayam et al. | |
| 2011/0191342 A1 | 8/2011 | Cohen et al. | |
| 2011/0213753 A1* | 9/2011 | Manmohan | G06F 11/2023 707/640 |
| 2012/0131674 A1 | 5/2012 | Wittenschlaeger et al. | |
| 2012/0151032 A1 | 6/2012 | Ciavattone et al. | |
| 2012/0240183 A1 | 9/2012 | Sinha et al. | |
| 2013/0080375 A1 | 3/2013 | Viswanathan et al. | |
| 2013/0227636 A1 | 8/2013 | Bettini et al. | |
| 2013/0339515 A1 | 12/2013 | Radhakrishnan et al. | |
| 2014/0041031 A1* | 2/2014 | Prowell | G06F 21/56 726/23 |
| 2014/0068326 A1 | 3/2014 | Quinn et al. | |
| 2014/0189859 A1 | 7/2014 | Ramanan et al. | |
| 2015/0242623 A1* | 8/2015 | Lindo | G06F 21/552 726/23 |
| 2016/0173509 A1 | 6/2016 | Ray et al. | |
| 2016/0173525 A1 | 6/2016 | Thomas et al. | |
| 2016/0350531 A1 | 12/2016 | Harris et al. | |

FOREIGN PATENT DOCUMENTS

| | | |
|---|---|---|
| WO | WO-2016049319 | 3/2016 |
| WO | WO2016097686 | 6/2016 |
| WO | WO-2016196686 | 12/2016 |

OTHER PUBLICATIONS

Dongju, Ryu et al., "An Automatic Identification of a Damaged Malicious File Using HMM against Anti-Forensics", Networked Computing and Advanced Information Management, 2008. NCM '08. Fourth International Conference on, IEEE, Piscataway, NJ, USA, Sep. 2, 2008 (Sep. 2, 2008), XP031320134, ISBN: 978-0-7695-3322-3. 4.3. Continuity comparison of similar 2008 , pp. 177-184.

Kim, Gene H. et al., "The Design and Implementation of Tripwire: A File System Integrity Checker", ACM, 2 Penn Plaza, Suite 701—New York, USA, XP040076722 1994 , pp. 18-29.

Ham, et al., "Vulnerability Monitoring Mechanism in Android based Smartphone with Correlation Analysis on Event-Driven Activities", Proceedings of 2012 2nd International Conference on Computer Science and Network Technology Dec. 2014 , pp. 371-375.

Lee, et al., "An update-risk based approach to TTL estimation in Web caching", Proceedings of the Third International Conference on Web Information Systems Engineering Dec. 2002 , 9 pages.

Cheng, Te-Chang et al., "System Failure Forewarning Based on Workload Density Cluster Analysis", Nov. 2011 , pp. 227-232.

Channakeshava, Karthik et al., "High performance scalable and expressive modeling environment to study mobile malware in large dynamic networks", 2011 IEEE International Parallel & Distributed Processing Symposium May 2011 , pp. 770-781.

USPTO, "U.S. Appl. No. 14/569,944 Final Office Action dated Sep. 23, 2016", 14 pages.

USPTO, "U.S. Appl. No. 14/569,944 Notice of Allowance dated Apr. 10, 2017", 10 Pages.

USPTO, "U.S. Appl. No. 14/570,188 Notice of Allowance dated Sep. 23, 2016", 15 pages.

USPTO, "U.S. Appl. No. 14/570,188 Notice of Allowance dated Nov. 10, 2016", 16 pages.

USPTO, "U.S. Appl. No. 15/235,722 Non-Final Office Action dated Nov. 4, 2016", 33 pages.

USPTO, "U.S. Appl. No. 14/570,578 Notice of Allowance dated May 18, 2016", 19 pages.

USPTO, "U.S. Appl. No. 14/569,944, Notice of Allowance dated Jun. 23, 2017", 12 pages.

USPTO, "U.S. Appl. No. 14/570,188, Notice of Allowance dated Dec. 16, 2016", 18 pages.

USPTO, "U.S. Appl. No. 15/235,722, Notice of Allowance dated Apr. 20, 2017", 21 pages.

USPTO, "U.S. Appl. No. 14/569,944 Non-Final Office Action dated Jan. 15, 2016", 20 pages.

USPTO, "U.S. Appl. No. 14/570,188 Non-Final Office Action dated Jan. 14, 2016", 29 pages.

USPTO, "U.S. Appl. No. 14/570,578 Non-Final Office Action dated Dec. 21, 2015", 22 pages.

WIPO, "PCT Application No. PCT/GB2015/053676 International Preliminary Report on Patentability dated Jun. 29, 2017", 11 pages.

ISA—EP Office, "PCT Application No. PCT/GB2015/053676 International Search Report and Written Opinion dated Apr. 15, 2016", 17 pages.

ISA—EP Office, "PCT Application No. PCT/GB2015/053676 Invitation to Pay Additional Fees with Partial International Search Report dated Feb. 10, 2016", 7 pages.

IPO, "UK Application No. 1711325.9 Examination Report dated Jan. 23, 2018", 6 pages.

IPO, "UK Application No. 1713286.1 Search and Examination Report dated Jan. 30, 2018", 5 pages.

IPO, "UK Application No. 1713287.9 Combined Search and Exam Report dated Jan. 30, 2018", 7 pages.

* cited by examiner

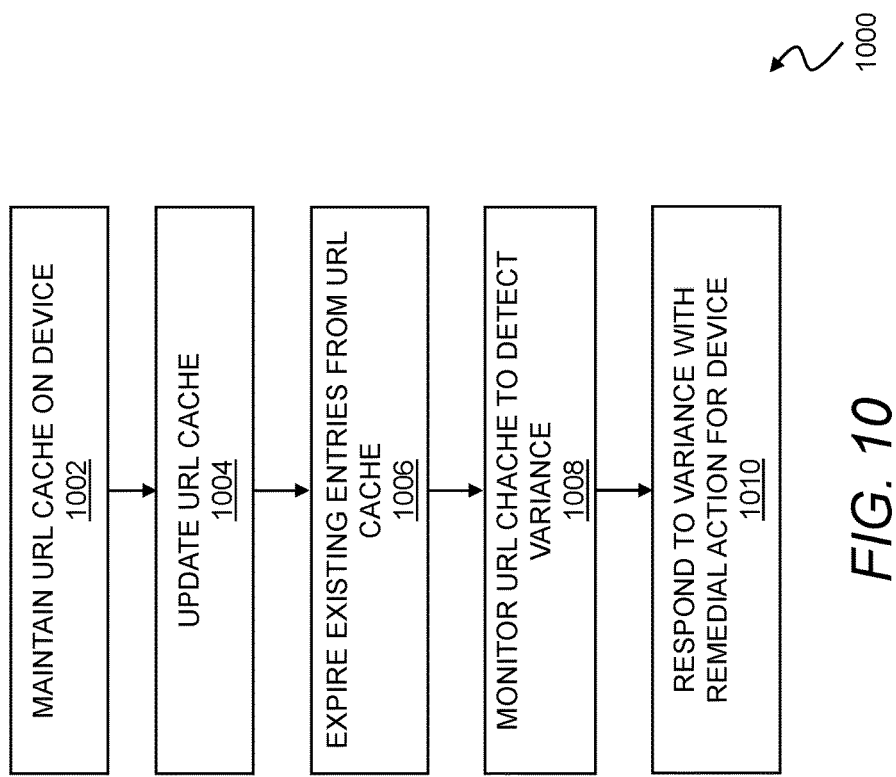

SERVER DRIFT MONITORING

RELATED APPLICATIONS

This application is a continuation of U.S. patent application Ser. No. 14/569,944 filed on Dec. 15, 2014, which is incorporated herein by reference in its entirety.

This application is also related to the following commonly-owned U.S. patent applications each filed on Dec. 15, 2014 and each incorporated herein by reference in its entirety: U.S. patent application Ser. No. 14/570,188 (now U.S. Pat. No. 9,571,512) and U.S. patent application Ser. No. 14/570,578 (now U.S. Pat. No. 9,419,989).

TECHNICAL FIELD

This application relates to network security, and more specifically to improved techniques for threat detection in an enterprise network.

BACKGROUND

Antivirus and advanced persistent threat (APT) protection systems typically rely on platform-dependent attributes of various computing objects, or other detailed information about reputation, behavior, and the like. There remains a need for malware detection techniques that increase sensitivity to relevant events without requiring a corresponding increase in data storage and communications between an endpoint and a remote threat management facility.

SUMMARY

Threat detection is improved by monitoring variations in observable events and correlating these variations to malicious activity. The disclosed techniques can be usefully employed with any attribute or other metric that can be instrumented on an endpoint and tracked over time including observable events such as changes to files, data, software configurations, operating systems, and so forth. Correlations may be based on historical data for a particular machine, or a group of machines such as similarly configured endpoints. Similar inferences of malicious activity can be based on the nature of a variation, including specific patterns of variation known to be associated with malware and any other unexpected patterns that deviate from normal behavior. Embodiments described herein use variations in, e.g., server software updates or URL cache hits on an endpoint, but the techniques are more generally applicable to any endpoint attribute that varies in a manner correlated with malicious activity.

In one aspect, a method includes: configuring a plurality of servers, each one of the plurality of servers including one or more executables forming a baseline; instrumenting the plurality of servers to detect a drift including a change in the one or more executables from the baseline of the one of the plurality of servers; monitoring the drift of the plurality of servers; and initiating a remedial action when a drift of a first one of the plurality of servers deviates beyond a predetermined threshold from a drift of each other one of the plurality of servers.

Implementations may have one or more of the following features. The executables may include at least one of a native executable file, an interpreted file, a script, a dynamic linked library, and an Adobe flash file. The change may include an update to an application, an installation of a new application, or an addition of at least one of a new dynamic linked library, a resource file, interpreted data file, and configuration file. The remedial action may include at least one of a quarantine, a deactivation, and a notification. Monitoring may include filtering at least one change to exclude the at least one change from the drift. The filtering may include filtering at least one change initiated by a trusted updater. Monitoring may include monitoring by a number of classes of changes, where the predetermined threshold is a different threshold for each of the number of classes. The number of classes may specify one or more actors initiating changes selected from a group consisting of an application, a user of the application, a passive authorized user, an active authorized user, and a trusted updater.

In another aspect, a computer program product comprising non-transitory computer executable code embodied in a non-transitory computer readable medium that, when executing on one or more computing devices, may perform the steps of: configuring a plurality of servers, where each one of the plurality of servers include one or more executables forming a baseline; instrumenting the plurality of servers to detect a drift including a change in the one or more executables from the baseline of the one of the plurality of servers; monitoring the drift of the plurality of servers; and initiating a remedial action when a drift of a first one of the plurality of servers deviates beyond a predetermined threshold from a drift of each other one of the plurality of servers.

In yet another aspect, a system includes: a plurality of servers each configured with one or more executables forming a baseline; a local drift monitor executing on each one of the plurality of servers, where the local drift monitor is configured to detect a drift including a change in the one or more executables; and a threat management facility coupled in a communicating relationship with each one of the plurality of servers, where the threat management facility includes a global drift monitor configured to monitor data from the local drift monitor on each one of the plurality of servers, and the threat management facility is configured to initiate a remedial action when a drift of a first one of the plurality of servers deviates beyond a predetermined threshold from a drift of each other one of the plurality of servers.

In another aspect, a method includes: configuring a plurality of servers; instrumenting the plurality of servers to detect a behavior; monitoring the behavior on each of the plurality of servers; and initiating a remedial action when the behavior on a first one of the plurality of servers deviates beyond a predetermined threshold from the behavior on each other one of the plurality of servers.

In one aspect, a method includes: selecting a metric that objectively and quantitatively characterizes an endpoint property; monitoring a change in the metric on a group of endpoints over time; creating a model that evaluates whether a new value for the metric at a point in time is within a range of expected values for the metric at the point in time; instrumenting an endpoint to detect a current value for the metric at a current time; applying the model to determine whether the current value is within the range of expected values for the metric at the current time; and reporting an indication of compromise for the endpoint when the current value is not within the range of expected values for the metric at the current time.

Implementations may have one or more of the following features. The group of endpoints may include two or more endpoints. The endpoint may belong to the group of endpoints. The method may further include detecting a new current value for the metric and applying the model to the new current value for the metric when the current value is within the range of expected values. Monitoring the change in the metric over time may include acquiring historical data for the endpoint, or monitoring behavior for a plurality of endpoints in an enterprise. The model may include a statistical model having a variance for the metric that is used to determine the range of expected values, a Bayesian model having a Bayesian probability that provides a threshold for determining the range of expected values, or a frequency domain model. The method may further include selecting and modeling a plurality of metrics and using the plurality of metrics to detect the indication of compromise. The model may include a periodicity that characterizes a change in the range of expected values that varies over time. The periodicity may be daily, weekly, or annually. The metric may measure Uniform Resource Locators (URLs) addressed by the endpoint, files accessed by the endpoint, or updates to executables on the endpoint.

In another aspect, a computer program product comprising non-transitory computer executable code embodied in a non-transitory computer readable medium that, when executing on one or more computing devices, may perform the steps of: selecting a metric that objectively and quantitatively characterizes an endpoint property; monitoring a change in the metric on a group of endpoints over time; creating a model that evaluates whether a new value for the metric at a point in time is within a range of expected values for the metric at the point in time; instrumenting an endpoint to detect a current value for the metric at a current time; applying the model to determine whether the current value is within the range of expected values for the metric at the current time; and reporting an indication of compromise for the endpoint when the current value is not within the range of expected values for the metric at the current time.

In yet another aspect, an endpoint includes: a network interface coupling the endpoint in a communicating relationship with a data network; a memory storing a value for a metric that objectively and quantitatively characterizes an endpoint property, along with a model that evaluates whether a new value for the metric at a point in time is within a range of expected values for the metric at the point in time; and a processor configured to detect a current value for the metric at a current time, to apply the model to determine whether the current value is within the range of expected values for the metric at the current time, and to report an indication of compromise through the network interface to a remote threat management facility when the current value is not within the range of expected values for the metric at the current time.

In one aspect, a method includes maintaining a URL cache on each of a plurality of devices, where the URL cache includes a reputation score and a time to live for each of a plurality of URLs. The method may also include updating the URL cache on each of the plurality of devices using reputation scores from a remote threat management facility to add new entries for new URL traffic to the URL cache and using the time to live to expire existing entries from the URL cache, and monitoring the URL cache of each one of the plurality of devices with the remote threat management facility to detect a variance in one of the URL caches relative to each other one of the URL caches.

Implementations may have one or more of the following features. The variance may include a deviation in size of the one of the URL caches, a deviation in average reputation, a deviation in average time to live, or a presence of one or more unique URLs. The method may further include responding to the variance with a remedial action for the device storing the one of the URL caches. The reputation score may depend on popularity, frequency of requests, or historically determined trust. The time to live may depend on reputation. At least one of the plurality of devices may include a web server, an endpoint, or a mobile device.

In another aspect, a computer program product comprising non-transitory computer executable code embodied in a non-transitory computer readable medium that, when executing on one or more computing devices, may perform the steps of: maintaining a URL cache on each of a plurality of devices, the URL cache including a reputation score and a time to live for each of a plurality of URLs; updating the URL cache on each of the plurality of devices using reputation scores from a remote threat management facility to add new entries for new URL traffic to the URL cache and using the time to live to expire existing entries from the URL cache; and monitoring the URL cache of each one of the plurality of devices with the remote threat management facility to detect a variance in one of the URL caches relative to each other one of the URL caches.

In yet another aspect, a system includes: a remote threat management facility configured to manage threats to an enterprise; and a plurality of devices associated with the enterprise, where each of the plurality of devices has a memory and a processor, the memory storing a URL cache including a reputation score and a time to live for each of a plurality of URLs, and the processor configured to update the URL cache on each of the plurality of devices using reputation scores from the remote threat management facility to add new entries for new URL traffic to the URL cache and using the time to live to expire existing entries from the URL cache. The remote threat management facility may be further configured to monitor the URL cache of each one of the plurality of devices to detect a variance in one of the URL caches relative to each other one of the URL caches.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 10 is a flowchart of a method for threat detection using URL cache hits.

DETAILED DESCRIPTION

Figure 1:
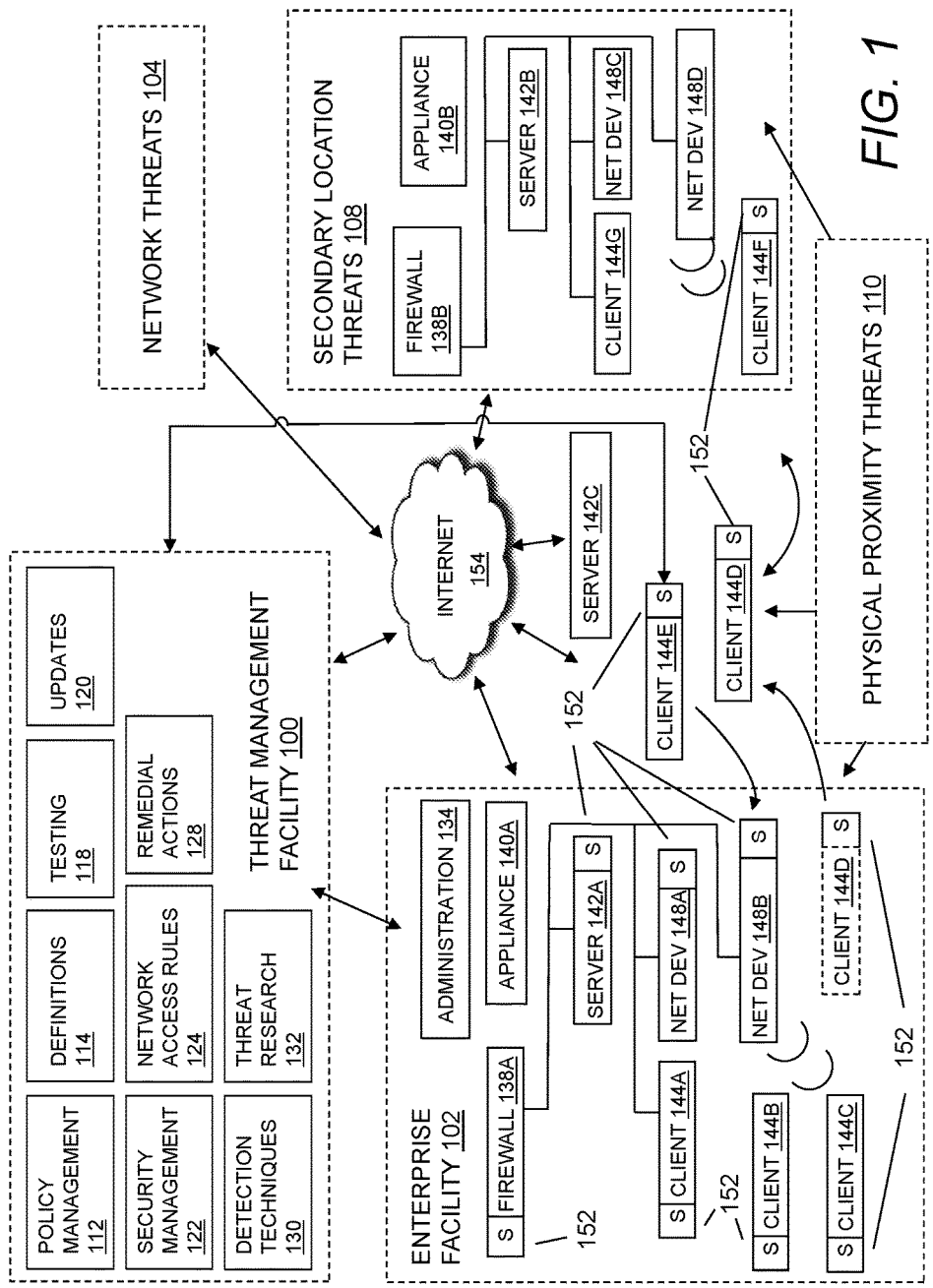
FIG. 1 illustrates an environment for threat management.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "above," "below," and the like, are words of convenience and are not to be construed as limiting terms unless expressly state otherwise.

While techniques described herein may emphasize certain threat management techniques such as the detection (and, in some instances remediation) of advanced persistent threats (APTs) that can be manually and remotely controlled through a remote command and control infrastructure, it will be appreciated that the disclosed systems and methods are more generally applicable in a wide variety of threat management contexts including malware, viruses, and the like that might not be classified as APTs. In general, the techniques disclosed herein may be usefully employed in any context where the presence of an actual or potential threat manifests itself in variations of one or more observable metrics on an endpoint. For example, the disclosed systems and methods are applicable to targeted attacks, e.g., attacks that are directly controlled by an adversary or that are run remotely by semiautonomous or fully autonomous software with the intention being to breach, attack, penetrate, etc., the security put in place to protect assets and maintain the integrity of systems protected. Thus, references to APTs or other threats throughout this document should be understood to also refer to any threat or other malware or the like that might be usefully remediated using the techniques described herein. More generally, the scope of this disclosure is not limited by the context and examples provided herein, but is intended to include any other adaptations or uses of the disclosed techniques for enterprise security that might be apparent to one of ordinary skill in the art.

An environment for threat management where the devices, systems, and methods discussed herein may be utilized will now be described.

FIG. 1 illustrates an environment for threat management. Specifically, FIG. 1 depicts a block diagram of a threat management system providing protection to an enterprise against a plurality of threats. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both technical and user perspectives, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities, or the like.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

In embodiments, the threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility, the enterprise facility 102 network and/or client facility may pull information from the security facility 122 and policy management facility 112 network server facilities 142, there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

In an embodiment, a definition management facility 114 may provide for the timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility application should be granted access to a requested network location. The network location may be on the same network as the facility or may be on another network. In an embodiment, the network access control may verify access rights for client facilities from within the network or may verify access rights of computer facilities from external networks. When network access for a client facility is denied, the network access control may send an information file to the client facility, the information file may contain data or commands that may provide instructions for the remedial action facility 128. The information sent by the network access facility 124 control may be a data file. The data file may contain a number of commands, definitions, instructions, or the like to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like (such as a user's desktop computer as an end-point computer), a firewall as a data evaluation end-point computer system, a laptop as a mobile end-point computer, a PDA or tablet as a hand-held end-point computer, a mobile phone as an end-point computer, or the like. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the end-point computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated end-point computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same end-point computer security facility 152, and the same threat protected enterprise facility 102 environment. Mobile wireless facility clients 144B-F, because of their ability to connect to any wireless 148B, D network access point, may connect to the Internet 154 outside the enterprise facility 102, and therefore outside the threat-protected environment of the enterprise facility 102. In this instance the mobile client facility (e.g., the clients 144 B-F), if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded end-point computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile client facilities may receive the same interactions to and from the threat management facility 100 as client facilities inside the enterprise facility 102, where the mobile client facilities may be considered a virtual extension of the enterprise facility 102, receiving all the same services via their embedded end-point computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, web sites, e-mail, IM, VoIP, application software, and the like. These threats may attempt to attack a mobile enterprise client facility (e.g., the clients 144B-F) equipped with an end-point computer security facility 152, but in embodiments, as long as the mobile client facility is embedded with an end-point computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 end-point computer security facility 152 may manage actions in unprotected network environments such as when the client facility (e.g., client 144F) is in a secondary location 108 or connecting wirelessly to a non-enterprise facility 102 wireless Internet connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

In general, the devices, systems, and methods discussed herein may implement a variety of threat management techniques such as those described in U.S. patent application Ser. No. 14/263,955 filed on Apr. 28, 2014 (Advanced Persistent Threat Detection), U.S. patent application Ser. No. 13/658,977 filed on Oct. 24, 2012 (Threat Detection through the Accumulated Detection of Threat Characteristics), U.S. patent application Ser. No. 14/485,759 filed on Sep. 14, 2014 (Labeling Computing Objects for Improved Threat Detection), U.S. patent application Ser. No. 14/485,762 filed on Sep. 14, 2014 (Normalized Indications of Compromise), U.S. patent application Ser. No. 14/485,765 filed on Sep. 14, 2014 (Data Behavioral Tracking), U.S. patent application Ser. No. 14/485,769 filed on Sep. 14, 2014 (Labeling Objects on an Endpoint for Encryption Management), U.S. patent application Ser. No. 14/485,771 filed on Sep. 14, 2014 (Using Indications of Compromise for Reputation Based Network Security), U.S. patent application Ser. No. 14/485,774 filed on Sep. 14, 2014 (Key Management for Compromised Enterprise Endpoints), U.S. patent application Ser. No. 14/485,782 filed on Sep. 14, 2014 (Firewall Techniques for Colored Objects on Endpoints), and U.S. patent application Ser. No. 14/485,790 filed on Sep. 14, 2014 (Threat Detection using a Time-Based Cache of Reputation Information on an Enterprise Endpoint). The content of each of these applications is hereby incorporated by reference in its entirety.

Having provided an overall context for threat detection, the description now turns to server drift monitoring, threat detection using endpoint variance, and using URL cache hits for variance detection.

Figure 2:
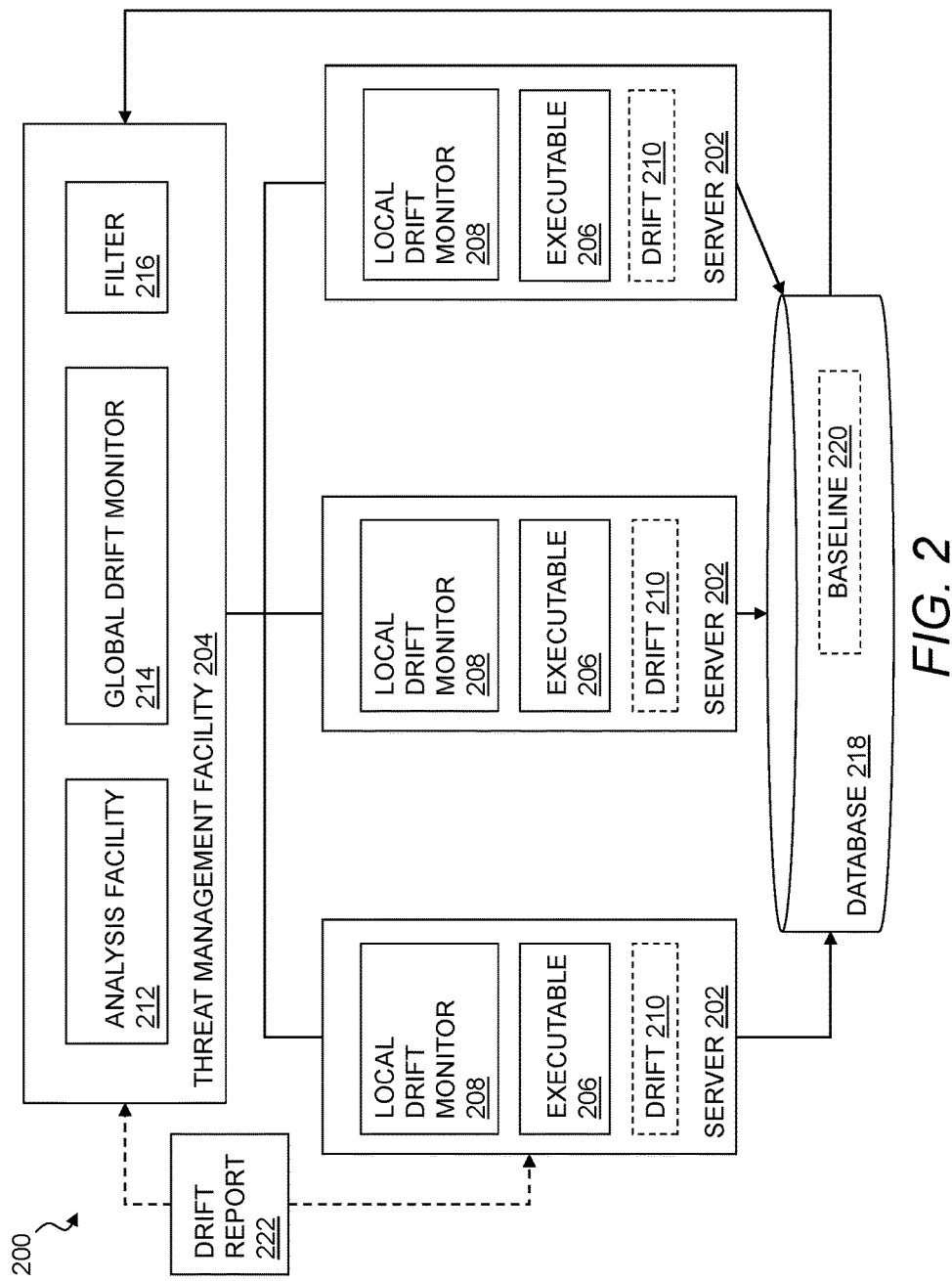
FIG. 2 illustrates a system for server drift monitoring.

FIG. 2 illustrates a system for server drift monitoring. The system 200 may be part of a threat management system and may include a number of entities participating in a threat management process such as any of the entities and processes described herein. In general, the system 200 may enable the monitoring of changes in executables from a known baseline configuration. The system 200 may use server lockdown drift reports or the like to detect a compromise, and based on such reports, the system 200 may support remedial action when a server is drifting away from the baseline in a manner different from other servers.

In general, the system 200 may include a number of servers 202 of an enterprise, such as any of the enterprises described above, and a threat management facility 204 such as a remote threat management facility for managing threats to the servers 202.

The servers 202 may be any server known in the art, e.g., any running instance of an application capable of accepting requests from a client and providing responses accordingly. The servers 202 may run on any endpoint or other computing device, and may, for example, include virtual servers instantiated on a virtual computing platform, physical servers executing on dedicated hardware, or any combination of the foregoing. The servers 202 may include computer programs running to serve the requests of other programs on behalf of a client. A user or client may connect to the servers 202 through a network. The servers 202 may include a program that operates as a socket listener. In general, the servers 202 may provide services across a network, either to private users or to public users via the network or some combination of these. The servers 202 may include without limitation database servers, file servers, mail servers, print servers, web servers, gaming servers, application servers, and so forth. The servers 202 may alternatively be part of a peer-to-peer network that enables endpoints to act as either a server or a client as needed. The servers 202 may each include one or more executables 206 and a local drift monitor 208 for detecting drifts 210 as explained in more detail below. The executables 206 or other attributes of the servers 202 may form a baseline 220 for the servers 202. It will be appreciated that, while a single executable 206 is illustrated for each server 202, a server 202 may include any number of executables 206 consistent with a desired or intended user of the server 202.

The threat management facility 204, which may be any of the threat management facilities described herein, may reside in a local appliance, a virtual appliance (e.g., which could be run by a protected set of systems on their own network systems), a private cloud, a public cloud, and so forth. The threat management facility 204 may be coupled in a communicating relationship with each one of the servers 202. The threat management facility 204 may include an analysis facility 212, or it may work in conjunction with an external analysis facility (not shown) that analyzes threat data and provide rules and the like for use by the threat management facility 204 and servers 202 in managing threats. Each of these components may be configured with suitable programming to participate in the various threat detection and management techniques contemplated herein. The threat management facility 204 may monitor any stream of data from a server 202 exclusively, or use the full context of intelligence from the stream of all protected servers 202 or some combination of these. The threat management facility 204 may include a global drift monitor 214 and a filter 216. The threat management facility 204 may be configured to initiate a remedial action when a drift 210 of a server 202 deviates beyond a predetermined threshold from a drift 210 of other servers 202. The remedial action may include a quarantine, a deactivation, a restart, and the like.

The executable 206 may include executable code, which may include sequences of executable instructions. More generally, the executable 206 on the server 202 may include without limitation an executable file, an executable program, or any other software component, object, module or the like containing machine-readable instructions that cause one or more processors of the server 202 to perform indicated tasks, either directly or indirectly, according to encoded instructions. For example, the executable 206 may include without limitation a native executable file, an interpreted file, a script, a dynamic linked library (DLL), a flash file (e.g., an Adobe flash file), a machine code file, a function, a resource locator (e.g., Uniform Resource Locator (URL) or other Uniform Resource Identifier (URI)), a process, and so forth. Thus, the term executable as used herein should be interpreted broadly to include executables as well as a variety of other software items such as files, data, resource locators, DLLs, and the like unless another more specific meaning is expressly provided or otherwise clear from the context.

The local drift monitor 208 may monitor the drift 210 of a particular server 202 or a plurality of servers 202. The local drift monitor 208 may execute on each one of the servers 202. The local drift monitor 208 may be configured to detect a drift 210 including a change in the one or more executables 206. The local drift monitor 208 may generate a drift report 222, which it then may provide to the threat management facility 204.

The drift 210 may include a change in one or more executables 206 from the baseline 220 of one or more of the servers 202. In general, the drift 210 referred to here describes changes in a single server; however in certain circumstances, such as where multiple servers are being monitored concurrently, it may be useful to express the drift 210 in terms of a deviation from an average, median, or mode for a number of servers. Regardless of how they are expressed, relevant changes may include, without limitation, an update to an application, an installation of a new application, an addition of at least one of a new dynamic linked library (DLL), a resource file, an interpreted data file, a configuration file, and so forth. The drift 210 may also or instead include a process, a user, a data file, an endpoint, and so forth, or any change to the foregoing. The drift 210 may be caused by certain network targets of a URL, updating of a system configuration, installation of software, the opening, updating, or modification of files and the like, and so forth. Other items that may cause a drift 210 include, without limitation, a certain user logging into a system, failed login attempts, a change in temporary data file settings, a change in system settings, a change in system files, a change in user files, a change in program data, network access (e.g., based on a destination of a URL or a property of a URL), creation of new processes, child processes behaving in a certain manner, escalation or de-escalation of user privileges, crashes, spikes in activity or usage, updates, and so forth. The drift 210 may also or instead include any change in interesting events that are monitored or recorded on the system 200. The drift 210 may include an executable drift, that is a drift in the installed software itself, or a behavioral drift, that is, a drift in the actions performed be the software or events resulting therefrom.

In general, the drift 210 may include an addition of new objects (e.g., executables 206, files, processes, applications, network resources, and the like) that appear on a server 202 or system 200 compared with the baseline 220, as well as removal or modification of same. Detection of any changes in configuration may be encapsulated in a drift report 222, which may be created periodically, e.g., on a predetermined schedule, when explicitly requested, when a change occurs, or on any other fixed, variable or ad hoc schedule. The drift report 222 may describe which objects on a server 202 or system 200 have changed, or how they have changed when compared to the baseline 220. In one aspect, if these changing objects deviate away from a norm, e.g., the baseline 220, or a drift report 222 or the corresponding server configuration differs from a reference group of other servers (which may or may not include the server 202), in inference may be made that the server 202 is compromised, and any suitable remedial action may be initiated. The drift report 222 may be generated by the threat management facility 204 based on information from the server 202, or it may be generated at the server 202 (e.g., by the local drift monitor 208) or another component of the system 200 and communicated to the threat management facility 204 for analysis (e.g., analysis by the analysis facility 212 using tools such as the global drift monitor 214 and the filter 216).

The analysis facility 212 may provide a remote processing resource for analyzing malicious activities and creating rules suitable for detecting drifts 210 or threats based on information received from the servers 202 or threat management facility 204. The analysis facility 212 may be part of the threat management facility 204 as shown, or it may be a remote independent resource. The analysis facility 212 may include a variety of analysis tools, including without limitation, tools for regular expression, whitelisting/blacklisting, crowd sourcing, identifiers, and so forth. The tools may also or instead include information and tools such as URL look-ups, genotypes, identities, file look-ups, reputations, and so forth. The analysis facility 212 may also provide numerous related functions and capabilities such as a machine interface for receiving information on new, unknown files or processes, and for testing of such code or content in a sandbox on the analysis facility 212. In general, the analysis facility 212 may be within an enterprise, or the analysis facility 212 may be external to the enterprise and administered, for example, by a trusted third party. Further, a third-party source may provide additional threat data or analyses for use by the analysis facility 212 and the threat management facility 204. The analysis facility 212 may analyze and process the drift 210 or drift report 222, where a drift 210 or drift report 222 that deviates beyond a predetermined threshold sets off an alert or the like. The alert may include creating an Indication of Compromise ("IOC"), initiating a remedial action, or some combination thereof.

The global drift monitor 214 may be configured to monitor data from the local drift monitor 208 on each of the servers 202. In either of the global drift monitor 214 or the local drift monitor 208 there may be a built-in tolerance for a certain amount of drift 210, including for example an amount of change relative to a predetermined baseline, or an amount of change relative to changes in other servers. The tolerance for such variations may depend on any number of factors.

The filter 216 may sort the drifts 210, and filter changes of the drifts 210 using any suitable rules. In general, the filter 216 may exclude items that are not of interest for the system 200 to monitor. Thus for example, the filter 216 may exclude at least one change from the drift 210 such as a user change initiated by a valid user of one of the servers 202, or a change initiated by a trusted updater. These types of events, although they may change the configuration of a server relative to a baseline, are highly likely to not be malicious activity. Such actions including, e.g., updates to productivity applications, changes from a trusted user, changes by a trusted installer, and the like may be filtered out by the filter 216, thus reducing storage and computational overhead and potentially increasing sensitivity of malware detection by eliminating signal noise associated with marginally relevant or irrelevant system activity.

The database 218 use to store drift data may be a local or remote database. For example, the database 218 may be locally maintained on the server 202, on an endpoint, at the remote threat management facility 204, or at another suitable location (e.g., another database available throughout the network). The database 218 may be periodically, continuously, or otherwise updated with new information. In this manner, additional information may be cross-referenced from data repositories where the data is available for lookup after a baseline 220 is formed or during formation of the baseline 220. The database 218 may include the baseline 220.

The baseline 220 may include a known or expected configuration of executables 206 on a server 202 or a plurality of servers 202. The baseline 220 may also or instead include any other means for baselining the system, e.g., through an analysis of other objects including without limitation DLLs and other software objects or the like intended to fall within the scope of the term "executables 206" as used herein. The baseline 220 may be formed at a particular point in time, or it may be the average over a specified or predetermined period of time. The baseline 220 may thus be particular to one server 202, or it may be formed through information gathered from a plurality of servers 202. The baseline 220 may be used to form a predetermined threshold for a drift 210 of the servers 202. The baseline 220 may be stored on a database 218. After the baseline 220 is formed, the system 200 may lock down the servers 202 to prevent installation or execution of additional objects on the servers 202. This approach is particularly useful where servers are locked down because a more limited number and type of changes should be expected. Alternatively, after the baseline 220 is formed, the system 200 may only allow trusted objects to be installed or executed on the servers 202.

As discussed herein, the baseline 220 may be formed by scanning the executables 206 on the servers 202. The baseline 220 may then be used to changes in the software configuration of the server 202 or system 200. The drift 210 describes changes (e.g., new executables 206) to the baseline 220, including for example objects that are present but are not installed or executing, updated objects, and so forth.

The drift report 222 may include the drift 210, and may additionally or alternatively provide additional information related to the drift 210. For example, the drift report 222 may include information pertaining to timing, values, content, source, context, and so forth.

The system 200 may also or instead include components configured to perform server lockdown or whitelisting, or a combination thereof. Server lockdown may enable a true comparison of servers 202 in order to better identify relevant instances of drift 210. A locked down server may nonetheless facilitate certain types of changes under certain circumstances. For example, a server may allow installed software to be updated from reputable and trusted update sites, e.g., Microsoft®, Google®, or may permit installed, trusted software to install updates, and so forth.

Figure 3:
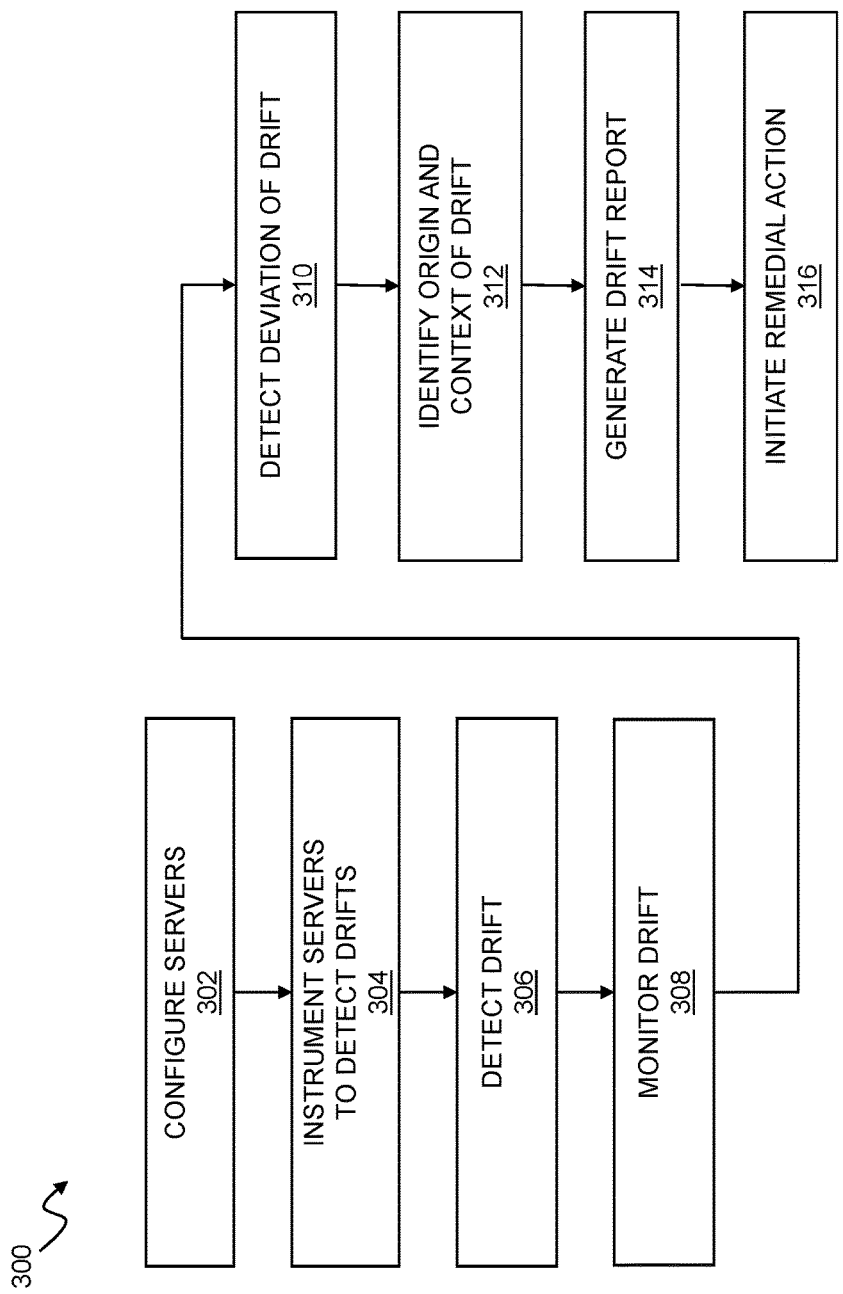
FIG. 3 is a flowchart of a method for server drift monitoring.

FIG. 3 is a flowchart of a method for server drift monitoring. This may, for example include a method 300 for operating the system described above.

As shown in step 302, the method 300 may include configuring a server or a plurality of servers with one or more executables, including by way of example any of the executables described above. This configuration may generally form a baseline, which may be captured or determined at any suitable time, such as when a server goes online, or when a server is locked down, whitelisted, or the like.

As shown in step 304, the method 300 may include instrumenting the servers to detect a drift, where the drift includes a change in the executable from the baseline of the one of the servers.

As shown in step 306, the method 300 may include detecting the drift of the servers. The drift may be any change in an executable on the server, or any other change in software that qualifies as a drift because it satisfies certain predetermined criteria. Detecting the drift may include determining that a drift has occurred on a server, receiving a notification of the drift at a remote monitoring facility, or otherwise identifying the occurrence locally or remotely (or some combination of these). The drift may be detected locally or remotely by a local drift monitor, a global drift monitor, a filter, an analysis facility, a threat management facility, a third-party resource, or some combination thereof.

As shown in step 308, the method 300 may include monitoring the drift of the servers. Monitoring the drift may include filtering at least one change to exclude the change from the drift. The change may be a user change initiated by a valid user of one of the servers, or any other change in the server including without limitation deletions, additions, updates, and so forth. Monitoring the drift may also or instead include monitoring behavior of a server in any suitable manner. Trusted updaters may also be monitored, where their associated timing and other attributes are noted by the system, e.g., in a drift report or the like. The drift may be monitored locally or remotely by a local drift monitor, a global drift monitor, a filter, an analysis facility, a threat management facility, a third-party resource, or some combination thereof. Monitoring the drift may also or instead include monitoring by a number of classes of changes, e.g., where the predetermined threshold is a different threshold for each of the number of classes. The number of classes may specify one or more actors initiating changes. The one or more actors may include, without limitation, an application, a user of the application, a passive authorized user, an active authorized user, a trusted updater, and so forth.

As shown in step 310, the method 300 may include detecting a deviation of the drift of the servers. The deviation may include a deviation beyond a predetermined threshold from a drift of each of the other servers. In this manner, the drift may be evaluated by reference to a local variation (e.g., how much a particular server has changed relative to itself) or a global variation (e.g., how much a particular server has changed relative to other servers). The context of the drift may be a consideration in measuring or evaluating the drift. For example, the amount of drift allowed may depend on the context such as what a server is used for, who the users of a server are, and so forth. The drift may be measured and evaluated by the threat management facility or on the server itself using a local drift monitor or the like.

As shown in step 312, the method 300 may include identifying the origin and context of the drift. This may include, for example, determining the original process, user, external resources, and so forth that caused a set of events that created the drift. By way of example, if the drift was caused by a system update, the original process may include a Windows Update (or the like) and the external resource may include a Windows Akamai resource (or the like).

The context of the drift may include the object acted upon by an executable (e.g., a program being updated), the time of the last global change (e.g., a password change, a system update, and the like), and the reputation and level of trust of the subject matter of the drift. The reputation may include whether the subject matter of the drift is known, which may be based on a specific globally identifiable quantity (e.g., URL, executable, and so forth). The level of trust may be based upon a measurement of change associated with the drift. In one aspect, the reputation and level of trust may be based on the origin of the drift, e.g., whether it is an endpoint, a process, a controlling executable, a URL, and so forth. In another aspect, the reputation and level of trust may also or instead be based on objects operated upon by the foregoing. For example, in this manner, the reputation of a process can change based upon what the process loads into memory.

As shown in step 314, the method 300 may include generating a drift report. The drift report may include information regarding the drift, including without limitation, its deviation beyond a predetermined threshold from a drift of each of the other servers, its content, its source, its timing, its context, and so forth.

As shown in step 316, the method 300 may include initiating a remedial action at a point in time, e.g., when a drift of a server deviates beyond a predetermined threshold from a drift of each other one of the servers. The remedial action may include quarantine, a deactivation, a restart, a notification, and so forth. In one aspect, the remedial action includes a server lockdown. The server lockdown may occur when the drift is known to be malicious. In this instance, the system is prevented from making the change and the server is locked. The drift may also or instead be recorded to prevent and remediate the same or similar drifts in the future.

Figure 4:
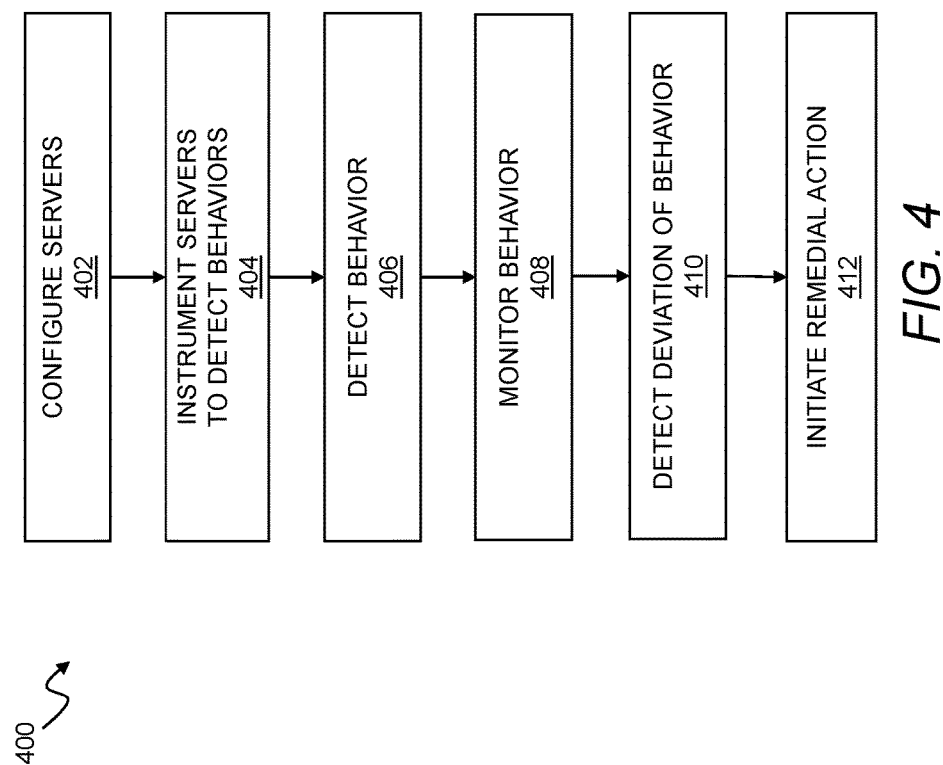
FIG. 4 is a flowchart of a method for server behavior monitoring.

FIG. 4 is a flowchart of a method for server behavior monitoring. The method 400 of FIG. 4 demonstrates how the concept of server drift may be applied to behaviors using, for example, behaviors monitored in a host-based intrusion prevention system (HIPs) or the like. This may include monitoring network traffic, system activities, and the like to identify individual events or patterns of events (e.g., behaviors) associated with malware or suspicious activity. In certain circumstances, individual behaviors or groups of behavior may not provide a strong indication of compromise in isolation, but may nonetheless be associated with a threat that can be identified based on how the behaviors deviate from a norm for the server. Thus, in an aspect, these suspicious behaviors are monitored for a drift from the norm to detect a possible indication of compromise.

These steps may in general mirror those for detecting suspicious drifts in server configuration as described above, except that server behavior is monitored rather than executables. As shown in step 402, the method 400 may include configuring a server or a plurality of servers. As shown in step 404, the method 400 may include instrumenting the servers to detect a behavior. As shown in step 406, the method 400 may include detecting the behavior of the servers. As shown in step 408, the method 400 may include monitoring the behavior on each of the servers. As shown in step 410, the method 400 may include detecting a deviation of the behavior of one of the servers. The deviation may include a deviation beyond a predetermined threshold from the behavior on each one of the other servers. As shown in step 412, the method 400 may include initiating a remedial action, e.g., when the behavior on one of the servers deviates beyond a predetermined threshold from the behavior on each other one of the servers. The remedial action may be any as described herein for other systems, methods, and techniques. For example, the remedial action may include quarantine, a deactivation, a restart, a notification, and so forth. In one aspect, the remedial action includes a server lockdown. The deviation in behavior may also or instead be recorded to prevent and remediate the same or similar deviations in the future. The remedial actions may also or instead include any remedial action described or referred to in any of the applications that are incorporated by reference into this application, and in particular U.S. patent application Ser. No. 14/485,765 filed on Sep. 14, 2014 (Data Behavioral Tracking).

The above systems and methods for server drift and behavior monitoring may also be applicable to other components of systems besides servers—e.g., devices, endpoints, and so forth.

Figure 5:
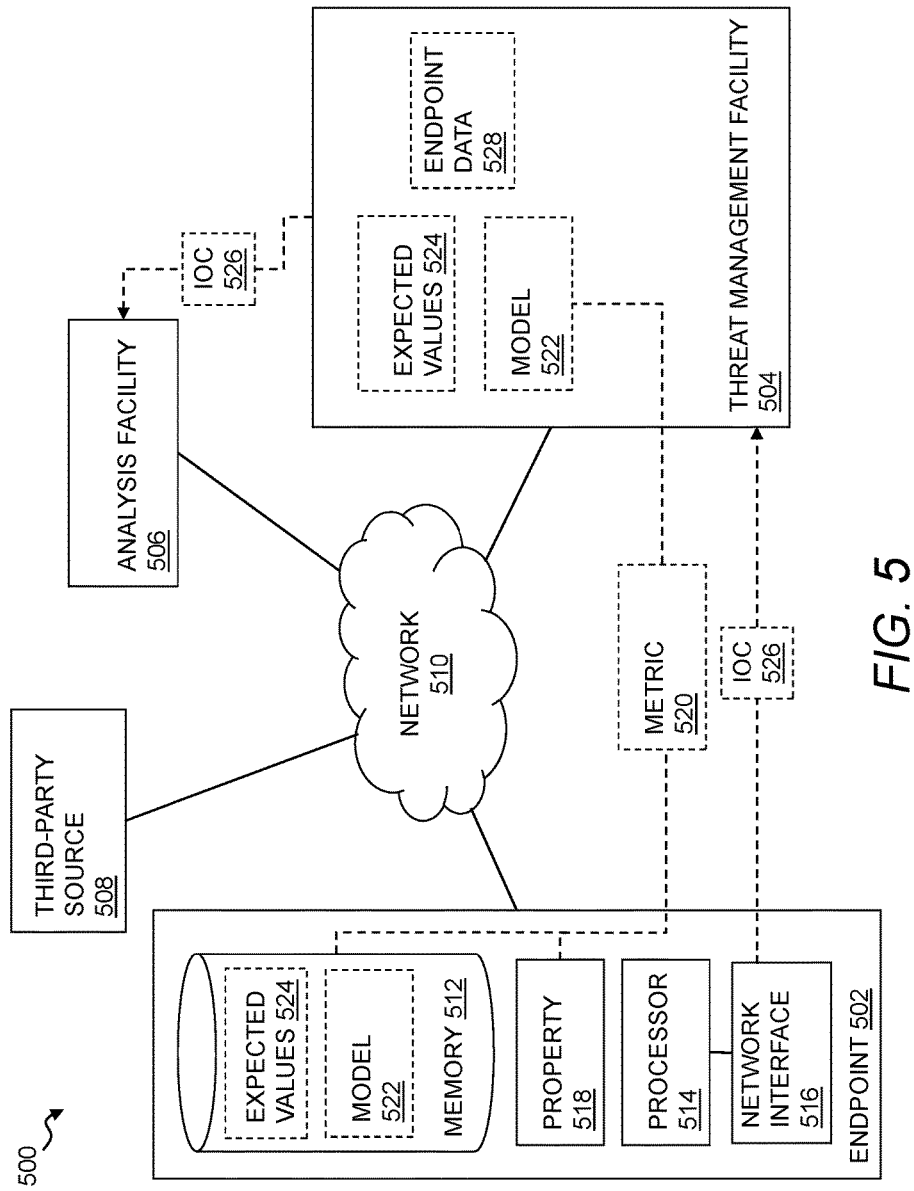
FIG. 5 illustrates a system for threat detection using endpoint variance.

FIG. 5 illustrates a system for threat detection using endpoint variance. In general, a model is created to characterize expected behavior and/or detect variations from an expected behavior for an endpoint. This model can then be used to monitor an endpoint and detect potential threats. The system may use a model 522 that is based on correlation of one or more metrics to actual incidences of threat, along with suitable instrumentation to monitor the metric(s) on an endpoint for use in threat detection. To this end, the system may periodically or continually measure and record various values that can be stored for some duration and used to calculate the expected value of the future measurements, e.g., based on the median or mean of the same or similar types of values. By comparing measurements to an expected value, the system may be configured to detect a variance from normal, where detecting a variance triggers an indication of compromise (IOC) or similar notification or analysis. It will be appreciated that the term "variance" as used in this context, contemplates any quantitative technique for measuring an amount and/or duration of variation from an expected value. While variance or deviation in the strict statistical sense may be usefully employed, this may also or instead include thresholds, averages, values based on integration or derivation, higher order patterns (e.g., second or third order) and so forth. More generally, any techniques suitable for quantitatively identifying expected behavior and then detecting unusual variations from that expected behavior may be usefully employed to measure variance as that term is intended herein.

One significant advantage to using variance in the manner described herein is that it does not rely on any a priori definitions of good or bad behavior or software. Instead, the system specifies values that are tracked, where a change in measurement to one or more such values is likely to be caused by a security compromise.

In general, the system 500 may include at least one endpoint 502 and a threat management facility 504 in an enterprise, such as any of the enterprises described above. An external analysis facility 506 may analyze threat data and provide rules and the like for use by the threat management facility 504 and the endpoint 502 in managing threats to the enterprise. The threat management facility 504 may reside in a local appliance, a virtual appliance (e.g., which could be run by a protected set of systems on their own network systems), a private cloud, a public cloud, and so forth. The analysis facility 506 may also receive threat information from a third-party source 508 such as MITRE Corporation or any other public, private, educational or other organization that gathers information on network threats and provides analysis and threat detection information for use by others. Each of these components may be configured with suitable programming to participate in the various threat detection and management techniques contemplated herein, and may be configured to interconnect via a network 510. The threat management facility 504 may monitor any stream of data from an endpoint 502 exclusively, or it may use the full context of intelligence from the stream of all protected endpoints 502 or some combination of these.

The endpoint 502 may be any of the endpoints described herein, or any other device or network asset that might join or participate in the enterprise or otherwise on a network 510. This may, for example, include a server, a client such as a desktop computer or a mobile computing device (e.g., a laptop computer or a tablet), a cellular phone, a smart phone, or other computing device suitable for participating in the network 510. The network 510 may in general include any data network or internetwork, including without limitation, local area networks, private networks, cellular networks, and so forth. In one aspect, the network 510 includes the Internet.

The analysis facility 506 may be within the enterprise, or the analysis facility 506 may be external to the enterprise and administered, for example, by a trusted third party. The analysis facility 506 may analyze indications of compromise (IOCs) 526, threats, malicious or suspected malicious behaviors, and the like, in the system 500. The analysis facility 506 may provide a remote processing resource for analyzing IOCs 526 and creating rules suitable for detecting IOCs 526 based on data received from the threat management facility 504 or the endpoint 502. The analysis facility 506 may include a variety of analysis tools, including without limitation, tools for regular expression, whitelisting/blacklisting, crowd sourcing, identifiers, and so forth. The analysis tools may also or instead include information and tools such as URL look-ups, genotypes, identities, file look-up, reputations, and so forth. The analysis facility 506 may also provide numerous related functions such as an interface for receiving information on new, unknown files or processes, and for testing of such code or content in a sandbox on the analysis facility 506. The analysis facility 506 may also or instead be configured to receive new threat information for analysis and creation of new rules as appropriate, as well as corresponding remedial actions. In one aspect, the threat management facility 504 includes the analysis facility 506.

The third-party source 508 may provide data or analyses for use by the analysis facility 506 and the threat management facility 504. The third-party source 508 may be a data resource that provides threat data and analyses, where the threat data is any data that is useful in detecting, monitoring, or analyzing threats or IOCs. For example, the threat data may include a database of threats, signatures, and the like. In one aspect, the third-party source 508 includes the analysis facility 506.

The endpoint 502 may include a memory 512, a processor 514, and a network interface 516.

The memory 512 may store a value for a metric 520 that objectively and quantitatively characterizes a property 518 of the endpoint 502. The memory 512 may also or instead include a model 522 that can be used to evaluate whether a new value for the metric 520 at a point in time is within a range of expected values 524 for the metric 520 at that point in time. As noted above, a wide range of mathematical and algorithmic tools are known in the art for determining when a new value for a metric is within a range of expected values for the metric, any of which may be used as the model contemplated herein.

The processor 514 may be configured to detect a current value for the metric 520 at a current time. The processor 514 may further be configured to apply the model 522 to determine whether the current value is within the range of expected values 524 for the metric 520 at the current time. The processor 514 may also or instead be configured to report an IOC 526 through the network interface 516 to the threat management facility 504 when the current value is not within the range of expected values 524 for the metric 520 at the current time.

The network interface 516 may couple the endpoint 502 in a communicating relationship with the network 510.

The endpoint 502 may also include a property 518, which, as stated above, may be objectively and quantitatively characterized by the metric 520. The property 518 may include any data, process, or combination of these including without limitation any process, application, executable, script, DLL, file, data, database, data source, data structure, function, resource locator (e.g., URL or URI), and so forth. The property 518 may also or instead include any attribute of any of the foregoing. The property 518 may also or instead include a remote resource, such as a resource identified in a URL.

The metric 520 may be a numerical value that represents the property 518 of an endpoint 502 in an objective manner. The metric 520 may, for example, measure URLs addressed by the endpoint 502, files accessed by the endpoint 502, updates to executables on the endpoint 502, changes made to the endpoint 502, and so forth. In general, the metric 520 may include any measurement or set of measurements that can instrumented on the endpoint 502 and correlated to potential threats as described herein. These measurements may be taken periodically, such as at fixed intervals, predetermined times, varying times in response to triggers or the like, or in any other manner or on any other schedule. The measurements may be delivered via a data feed to the endpoint 502 or from the endpoint 502 on any schedule useful for threat detection as contemplated herein.

A wide variety of metrics or measurements may be used with the system 500 described herein. For example, the metric may track a number of processes (e.g., zero to infinity, or some system limit) executing on an endpoint 502. The metric may track a processor load or other measure of how processing resources are being used. For example, processor utilization may be measured for processes on a scale of 0-100 where an 'idle' state is zero or close to zero, and a 'busy' state is greater than zero, and approaching 100 for full utilization of the processor by a single process. The metric may track open files or file handles or the like. The metric may track physical memory in use (e.g., where no memory in use is substantially close to zero and all memory in use is substantially close to 100 on a 0-100 scale). The metric may be based on system performance, where minimum performance is substantially close to zero and maximum performance is substantially close to 100 on a 0-100 scale). The metric may be based on the number of users (e.g., zero to infinity, or some system limit) of a machine, and may count system or software users differently from or the same as human users. The metric may be based on an amount of committed memory pages for all active processes (e.g., zero to infinity, or some system limit). The metric may be based on one or more network metrics such as the number of open network sockets connected to peers with private IP addresses, the number of open network sockets connected to peers with public IP addresses, the number of a certain type of cache hits or cache misses (e.g., SAV, SXL, or the like) over a certain period of time (e.g., the last five minutes), and so forth. The system 500 may collect these measurements over time, and compare the measurements with earlier measurements to determine whether current measurements have varied sufficiently enough to generate an IOC 526 or other warning or notice.

The metric 520 may combine a plurality of metrics together. The metric 520 may also or instead include meta-measurements, i.e., measurements calculated based on other measurements. In one aspect, the rate of change in a measure may be used as a metric 520. A feedback system or other control system may be used for time-based monitoring. Similarly, first or second order changes may be measured to determine rates of change, cumulative changes, and so forth.

The model 522 may evaluate whether a new value for the metric 520 at a point in time is within a range of expected values 524 for the metric 520 at that point in time. The model 522 may include a statistical model having a variance for the metric 520 that is used to determine the range of expected values 524. The model 522 may also or instead include a Bayesian model having a Bayesian probability that provides a threshold for determining the range of expected values 524. The model 522 may also or instead include a Fourier analysis, Kalman filtering, clustering, or the like. The model 522 may also or instead include a frequency domain model. More generally, the model 522 may include any form of predictive model useful for estimating a value or determining a range of expected values for a metric at a point in time. The model 522 may include a periodicity that characterizes a change in the range of expected values 524 over time. For example, the expected value 524 may have a periodicity with a daily, weekly, monthly, or annual pattern, or a periodicity that varies over any other regular or irregular period.

The model 522 may be built on the threat management facility 504, for example, using the range of expected values 524 and endpoint data 528 provided by the threat management facility 504. The model 522 may be generated based on the measurements of the metric(s) 520 over time, either at the endpoint 502, at some group of endpoints, at the threat management facility 504, or some combination of these. After the model 522 is created, e.g., on the threat management facility 504, the model 522 may then be sent to the endpoint 502 for use in variance-based detection of malicious activity.

The range of expected values 524 may account for cyclical, predictable variances over time (e.g., daily and weekly cyclic patterns, patterns over other time periods, and the like). Thus, the system 500 may calculate an appropriate daily, weekly, monthly (or any other time period that may be beneficial to this end), and lifetime expected values for a current measurement, e.g., to dampen the system's reaction to cyclical variance, so as to reduce false positives in IOCs 526. While a number of examples are provided of daily and weekly changes, it will be understood that other metrics may change very quickly, and expected values may be determined and checked against actual values at much higher frequencies such as by hour, by minute, by second, or by fractions of any of the foregoing.

The expected values 524 may include predictions regarding expected variances over certain periods of time, such as any of the time periods described above. The expected values 524 may then be calculated using the geometric median or mean over the appropriate window of time. Compensation for cyclical behavior may be made by initially 'selecting' all measurements that differ from their expected values 524 by more than a certain percentage (e.g., 5%). The system 500 may then compensate for cyclical patterns in measurements by 'unselecting' measurements whose values are within the certain percentage of expected values 524 for similar periods in the data set. Thus, the system 500 may produce as output the set of measurements that differ from their expected value 524 by more than the certain percentage, and which also differ from the same period in the comparison ranges. More generally, data may be filtered to remove or otherwise address outliers and/or inliers in any suitable manner. One skilled in the art will recognize that many other methods can be used to detect variance or unexpected behavior, and all such methods are intended to be included in the scope of this disclosure.

It will be understood that, while the preceding discussion suggests an explicit determination of expected values, the model 522 may take a variety of other forms. For example, a new value may be fed into the model 522, and the model 522 may provide a binary (yes or no) or weighted output describing whether the value is within an expected range, all without explicitly calculating or outputting specific expected values. Thus for example, the model 522 may simply indicate that a current value or group of recent values is within expected ranges or not within expected ranges, or the model 522 may provide a numeric output describing how close to an expected value the output is. This may be a statistical output (e.g., measuring how correlated the value is to an expected output) or some other metric that provides a figure of merit for how closely the measured value matches the expected value or range of values.

The IOC 526 may include any action or series of actions that cumulatively invoke a particular reporting or action rule. In particular, the IOC 526 may be automatically generated when a current value for the metric 520 is not within the range of expected values 524 for the metric 520. The IOC 526 may also or instead be detected through selecting and modeling a plurality of metrics 520 and using the plurality of metrics 520 in the model 522. The IOC 526 may be communicated to either or both of the threat management facility 504 and the analysis facility 506. The IOC 526 may be generated by the endpoint 502 and reported through the network interface 516 as shown in FIG. 5. Alternatively, the IOC 526 may be generated by the threat management facility 504, e.g., based on information obtained from the endpoint 502. The IOC 526 may include a malicious or strange behavior, or an indication of a malicious or strange behavior. The IOC 526 may be a normalized IOC that expresses one or more actions in a platform independent manner. That is, the IOC 526 may express a malicious behavior or suspected malicious behavior without reference to platform-specific information such as details of an operating system (e.g., iOS, MacOS, Windows, Android, Linux, and so forth), hardware, applications, and so forth. Thus, a normalized IOC may be suitable for identifying a particular threat across multiple platforms, and may include platform independent processes, actions, or behaviors. The IOC 526 may also or instead include any as described or referred to in any of the applications that are incorporated by reference into this application, and in particular U.S. patent application Ser. No. 14/485,762 filed on Sep. 14, 2014 (Normalized Indications of Compromise).

The endpoint data 528 may be any relevant data regarding the endpoint 502 that can be used by the threat management facility 504 to create a model 522. The endpoint data 528 may also or instead be used by the threat management facility 504 in generating, revising, or sending an IOC 526.

In one aspect, a measurement or metric of interest may be automatically selected for use in threat detection. For example, known malware may be detected while monitoring an endpoint, and the system (which may include an endpoint, a threat management facility, or some combination of these) may observe a pattern that occurs concurrently with an IOC 526 for the known malware. These measurements may then be used to create a new or revised model that can be deployed to endpoints for subsequent detection of the known malware. In one aspect, this may be performed entirely on an endpoint where local measurements do not result in an IOC, but instead result in a notification to the threat management facility to update a model or take other, similar action. Conversely, an IOC 526 received at a threat management facility may be used to trigger an investigation of an endpoint for possible metrics useful in identifying a particular threat.

Figure 6:
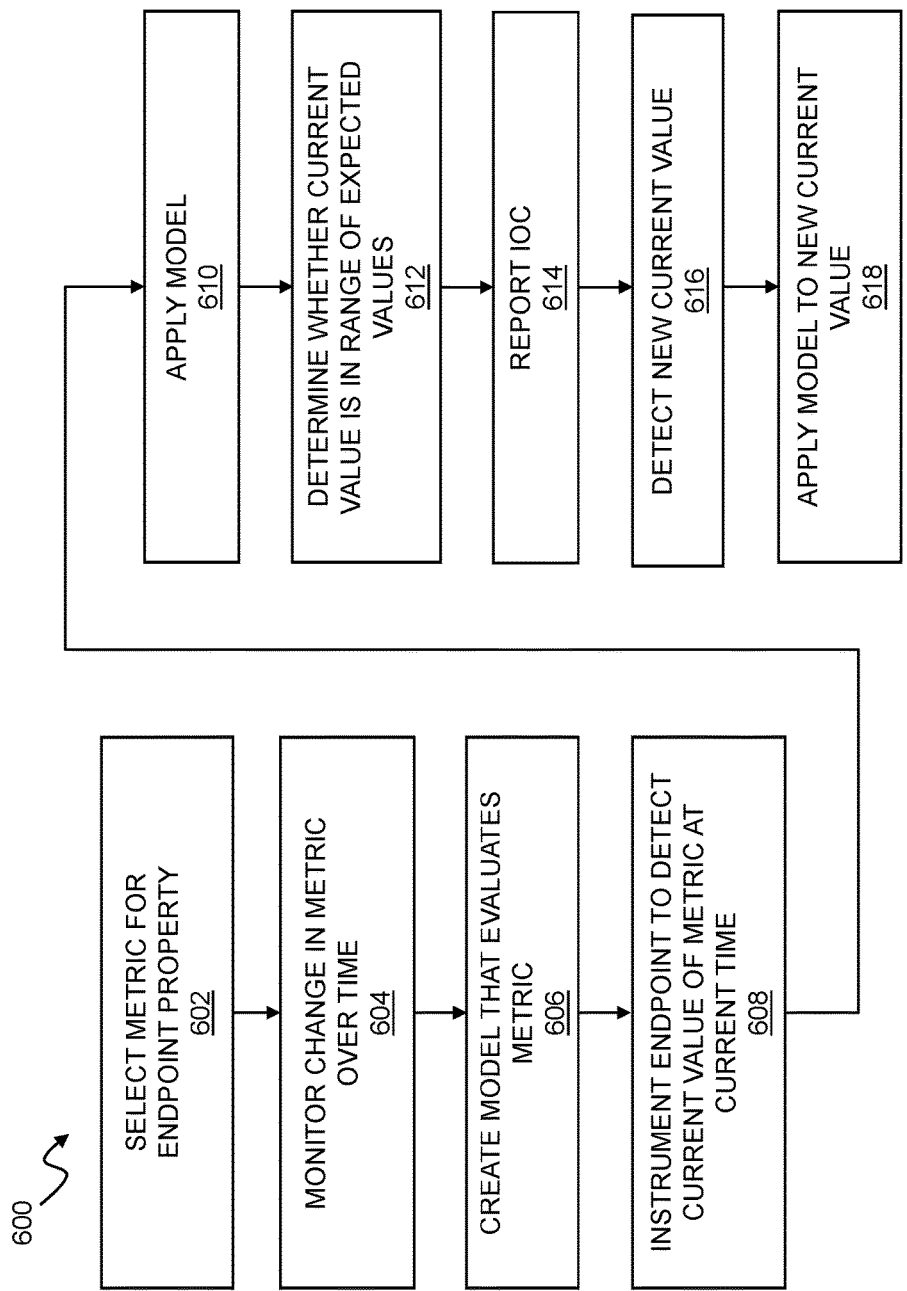
FIG. 6 is a flowchart of a method for threat detection using endpoint variance.

FIG. 6 is a flowchart of a method for threat detection using endpoint variance.

As shown in step 602, the method 600 may include selecting a metric that objectively and quantitatively characterizes a property of an endpoint (i.e., an endpoint property). This may be any suitable metric including metrics that are directly measurable (e.g., memory usage, number of processing threads, number of applications, number of network connections, number of users, etc.), or this may include metrics that are calculated, looked up (e.g., reputation), or any other metric(s) as well as combinations of the foregoing.

As shown in step 604, the method 600 may include monitoring a change in the metric on a group of endpoints over time. Monitoring the change in the metric over time may include acquiring historical data for the endpoint. The historical data or other useful data may be accumulated and stored on the endpoint or threat management facility for subsequent analysis and use, or it may be obtained from a third-party source. Monitoring the change in the metric over time may also or instead include monitoring behavior for a plurality of endpoints in an enterprise. A variety of threat detection tools may be present on an endpoint, any of which may be instrumented to support monitoring as contemplated herein. This may, for example, include monitoring tools such as a scanning engine, a whitelisting/blacklisting resource, a reputation analysis tool, a web filtering tool, an emulator, live protection, runtime detection, APT detection, network antivirus products, IOC detection, access logs, a heartbeat, a sandbox or quarantine system, and so forth. The group of endpoints may include two or more endpoints.

As shown in step 606, the method 600 may include creating a model that evaluates whether a new value for the metric at a point in time is within a range of expected values for the metric at that point in time. The model may be provided by a threat management facility or the like, and may be deployed on an endpoint for use in monitoring activity on the endpoint. As noted above, this model may explicitly report expected values, or this model may simply receive new values and provide a quantitative assessment of whether and to what extent the new values are within an expected range of values.

As shown in step 608, the method 600 may include instrumenting an endpoint to detect a current value for the metric at a current time. The endpoint may belong to the group of endpoints such as a plurality of endpoints associated with an enterprise.

As shown in step 610, the method 600 may include applying the model. In generally, the metric measured at the endpoint may be provided to the model for a determination of whether the value is expected or unexpected. The model may be applied to determine whether the current value is within the range of expected values for the metric at the current time using any of the techniques discussed herein.

As shown in step 612, the method 600 may include determining whether the current value is within the range of expected values for the metric at the current time. As stated above, this may include compensating for cyclical patterns in a variance. It will be noted that steps 610 and 612 are described separately, suggesting that applying the model and evaluating results are separate steps. This may be true in some implementations, e.g., where the model predicts expected values, and then a subsequent processing step is employed to evaluate whether the measured value matches the predicted value or range of values. However, these steps may also be readily combined where, for example, the model receives the measured value and provides a quantitative assessment of whether the measured value is expected or unexpected. All such variations that would be apparent to one of ordinary skill in the art are intended to fall within the scope of this disclosure.

As shown in step 614, the method 600 may include reporting an IOC for the endpoint when the current value is not within the range of expected values for the metric at the current time. In one aspect, detecting a variance in only one value generates an IOC, but detecting a concurrent variance in several values generates a 'stronger' IOC. Thus, for example, a number of different metrics may be concurrently measured and used in combination to provide more accuracy in detection or more sensitivity to possible threats. Similarly, a history of values for a metric may be usefully maintained to improve accuracy. For example, a single measured value beyond a threshold or outside an expected range may not be significant, but a consecutive number of such measurements may be highly indicative of a threat. It will also be understood that the term IOC as used herein should be understood broadly to include any notification to a threat management facility including without limitation, specific identifications of threats, notifications of potential but unidentified issues, or simply notifications of unusual behavior or activity. In one aspect, the IOC may include an explicit risk assessment such as a quantitative evaluation of potential threats or the like.

As shown in step 616, the method 600 may include detecting a new current value for the metric when the current value is within the range of expected values. Thus the method 600 may repeat as often as necessary or desired in a monitoring mode until a significant event is detected.

As shown in step 618, the method 600 may include applying the model to the new current metric when the current value is within the range of expected values.

As described herein, the method 600 may include the use of one or more metrics. For example, the method 600 may further include selecting and modeling a plurality of metrics and using the plurality of metrics to detect the IOCs.

Figure 7:
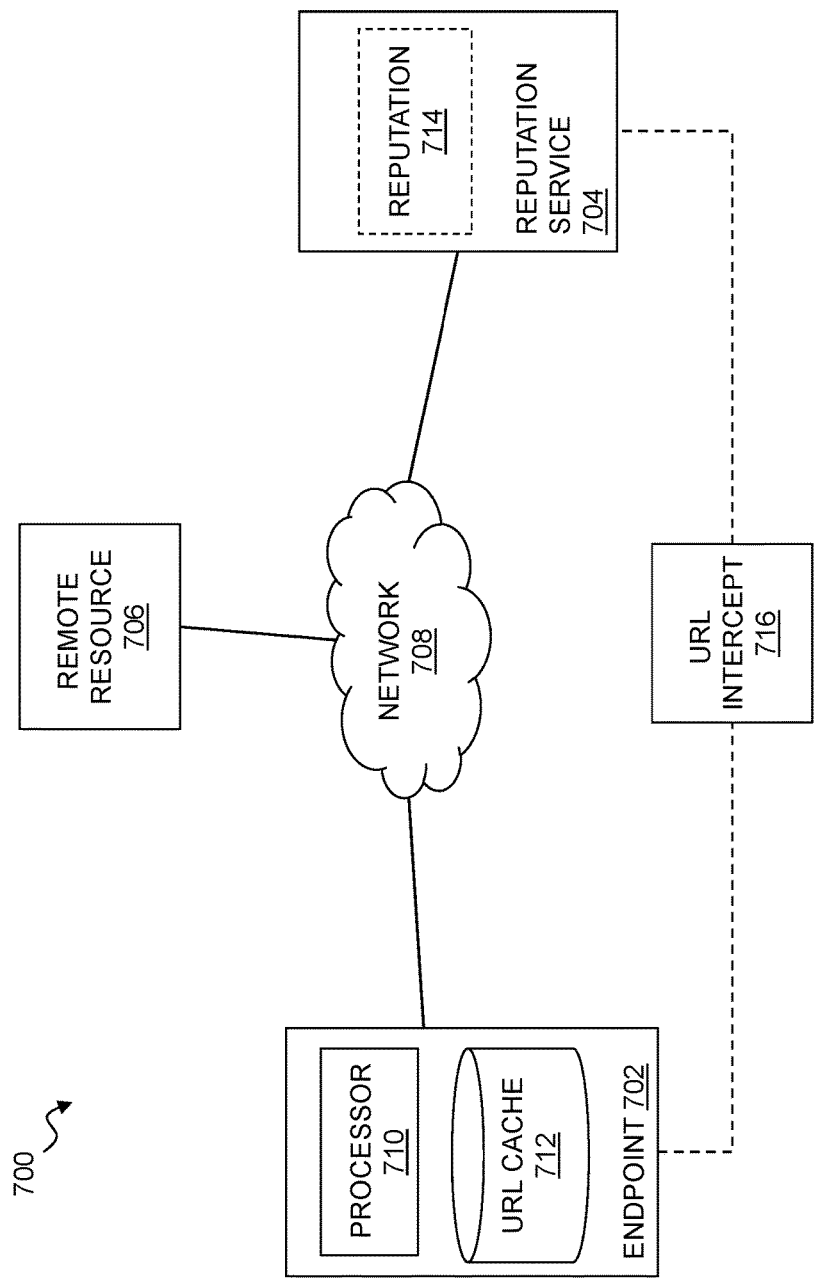
FIG. 7 illustrates a system for threat detection using URL caching.

FIG. 7 illustrates a system for threat detection using URL caching. In general, the system of FIG. 7 may locally cache a history of URLs on a number of different devices for an amount of time that varies for each URL according to reputation. With a URL cache maintained in this manner, threat detection may be based on unusual variations in the composition of the URL cache on one or more of the devices. In other words, by identifying unusual network traffic via a local URL cache for an endpoint compared to other endpoints new threats may be detected.

The system 700 may include an endpoint 702, a reputation service 704, and a remote resource 706 all interconnected through a network 708, which may be any of the networks described herein or otherwise known in the art.

The endpoint 702 may be any as described herein, and may include a processor 710 and a URL cache 712. The URL cache 712 may include a mechanism for temporary or permanent storage of URLs, web documents, HTML pages and images, and so forth. This may for example be a memory associated with the processor 710 or some other volatile or non-volatile storage on the endpoint 702.

The reputation service 704 may in general include a reputation management system for the generation, analysis, identification, editing, storing, sharing and so forth, of reputations 714 and other reputation information. The reputation service 704 may store a plurality of reputations 714, e.g., in a reputations database, and the reputation service 704 may be configured to share reputation information upon request from endpoints 702 or the like. The reputation service 704 may be in communication with the endpoint 702 through the network 708, or it may be indirectly in communication with the endpoint 702 through a URL intercept 716, or some combination of these. For example, when the processor 710 of the endpoint 702 requests a URL (e.g., a URL that specifies access to a remote resource 706), the reputation service 704 may provide a reputation 714 for the requested URL to the endpoint 702. The reputation service 704 may be part of a threat management facility or third-party service or resource as described elsewhere herein.

The reputation service 704 may employ reputation-based filtering, which may be similar to the reputation filtering discussed above with reference to FIG. 1. The reputation service 704 may be included on the endpoint 702, or the reputation service 704 may be located elsewhere in the system 700. The reputation service 704 may be a cloud-based service. The reputation service 704 may receive a URL or a stream of URLs, and may generate or utilize reputations 714 for the URLs. The reputation service 704 may also or instead receive IOCs, actions, behaviors, events, interactions, and so forth, and may generate or utilize reputations 714 for any of the foregoing. The reputation service 704 may generate or revise a reputation 714 based on URLs, behaviors, actions, events, interactions, IOCs, other reputations 714, a history of events, data, rules, state of encryption, and so forth. The reputation service 704 may utilize a third-party resource, e.g., for the third-party resource's reputation data.

The reputations 714 may relate to the trustworthiness of URLs or an attribute thereof. The reputations 714 may include URL reputations based on, e.g., popularity, frequency of requests, historically determined trust, whitelists/blacklists, and so forth. The reputations 714 may include lists of known sources of malware or known suspicious or malicious URLs. The reputations 714 may be stored in a reputations database included on the reputation service 704 or located elsewhere in the system 700. The reputations 714 may be expressed in any suitable or useful level of granularity such as with discrete categories (e.g., trusted, untrusted, unknown, malicious, safe, etc.) or with a numerical score or other quantitative indicator. The reputations 714 may also be scaled. By way of example, the reputation 714 may be associated with a reputation score or the like, which may be based on a predetermined scale, e.g., 0-100, where known trusted URLs would have a reputation score close to or equal to 100 and known untrusted/malicious URLs, or URLs for which there is no reputation data would have a reputation score close to or equal to 0. In another aspect, reputation information may be multi-dimensional, so that multiple aspects (e.g., known v. unknown, trusted v. untrusted) may be independently tracked.

The remote resource 706 may be a resource identified and accessed via a URL. For example, the remote resource 706 may include a webpage, a document, a file, a server or any other document or other resource that might be accessed by the endpoint 702 via a URL.

The URL intercept 716 may be configured to redirect a request from the endpoint 702 to access the remote resource 706 via a URL. In particular, the URL intercept 716 may redirect a URL request from the processor 710 to the reputation service 704.

As discussed above, in one aspect of the system 700, the processor 710 requests a URL (e.g., via a URL request), which is then redirected by the URL intercept 716 to the reputation service 704. The reputation service 704 may then return a reputation 714 to the endpoint 702, which then stores the reputation 714 in the URL cache 712. The processor 710 may then proceed to the remote resource 706 specified in the URL request. In certain circumstances, access to the URL may be expressly prohibited, e.g., by the URL intercept 716 or a threat management facility that receives a notification from the URL intercept 716, or by some local rule on the endpoint 702 or the like.

Figure 8:
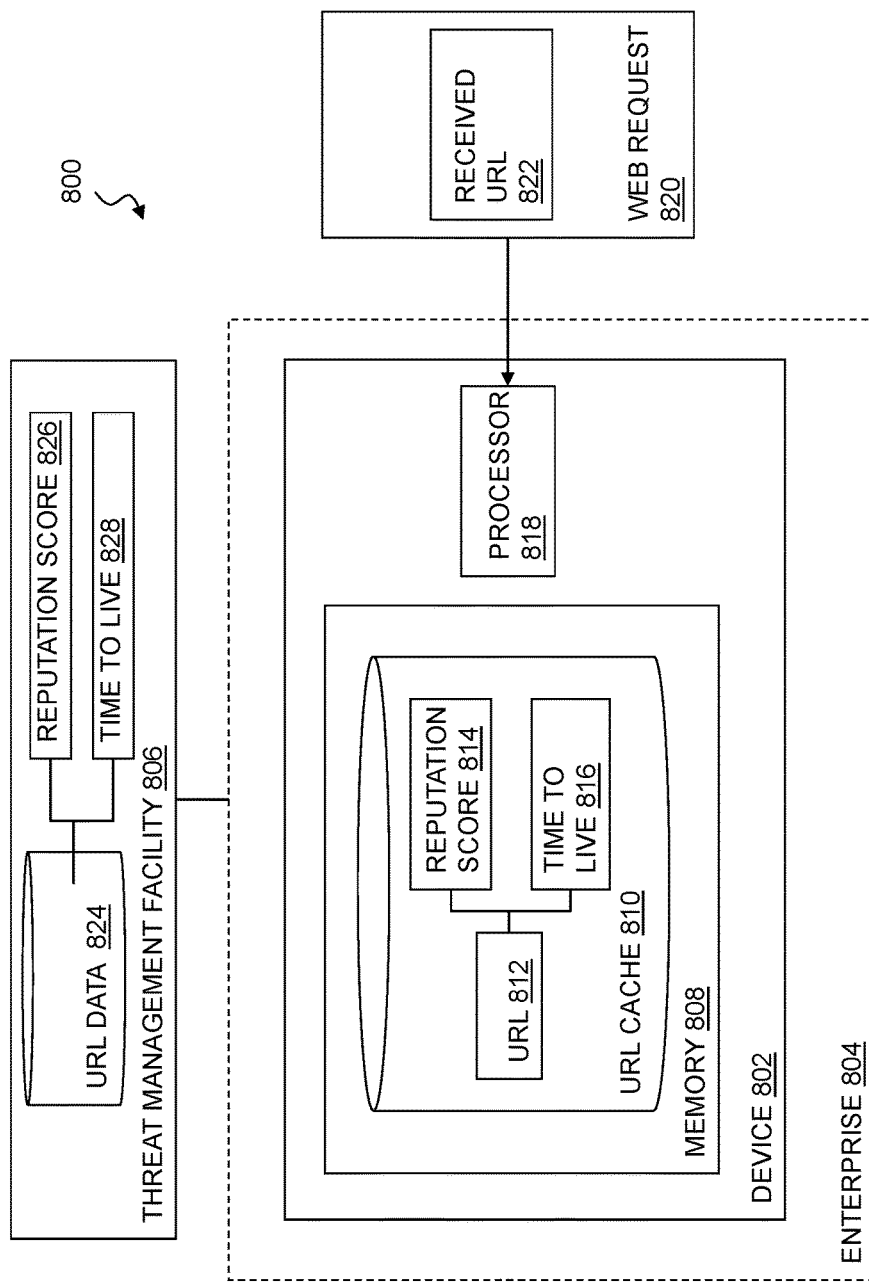
FIG. 8 illustrates a system for threat detection using URL caching.

FIG. 8 illustrates a system for threat detection based on URL caching. The system 800 may include a device 802 that is part of an enterprise 804, such as any enterprise described herein, and a threat management facility 806.

The device 802 may be any of the devices described herein, including without limitation a web server, an endpoint, a mobile device, and so forth. The device 802 may include a memory 808 and a processor 818. The memory may store and maintain a URL cache 810, which may be any URL cache as described herein or otherwise known in the art. The URL cache 810 may store a reputation score 814 and a time to live 816 for each of a plurality of URLs 812.

In general, the threat management facility 806 may maintain URL data 824 including a database of reputation scores for URLs that can be used to look up an appropriate reputation score 826 and a corresponding time to live 828 based upon a received URL 822. This may include URLs known to be associated with the enterprise 804, URLs known to be associated with malicious entities or software, URLs known to be trusted or untrusted, and so forth. The time to live may be directly correlated to reputation, or the time to live may vary according to whether and how the URL is to be maintained in an endpoint cache.

The reputation score 814, 826 may depend on, without limitation, popularity, frequency of requests, historically determined trust, and so forth. The reputation score 814, 826 may be based on reputations gathered by the threat management facility 806, which as stated above may include a reputation service. The reputation score 814, 826 may also or instead be based on any other suitable factors, including without limitation, a geographical distribution of instances of a URL on a plurality of devices 802. The reputation score 814, 826 may also or instead be based on a number of prior occurrences of a URL on the current device 802, or on a plurality of devices 802 in the enterprise 804. The reputation score 814, 826 may be expressed in any suitable or useful level of granularity such as with discrete categories (e.g., trusted, untrusted, unknown) or with a numerical score or other quantitative indicator. For example, the reputation score 814, 826 may be a two-state score (e.g., good or bad), a three-state score (e.g., good, bad, unknown), a five-state score (e.g., unknown, untrusted, highly untrusted, trusted, highly trusted), a range-bounded quantity (e.g., a score from 0-100), or any other suitable score for evaluating reputation with any desired degree of granularity. By way of example, a very popular and highly trusted URL may be associated with a very high reputation score 814, 826 (e.g., on a scale of 0-100, the reputation score 814, 826 would be close to 100).

The time to live 816, 828 may depend on reputation, e.g., the reputation score 814, 826. The time to live 816, 828 may specify a duration for retaining the reputation score 814, 826 or a record of the URL on the device 802. In this manner, particular URLs may be ranked by reputation, and may be retained or expired as appropriate for the nature of the potential threat. For example, where a URL becomes a conclusive indicator of a threat only when the URL recurs several times within a predetermined interval (or occurs within a predetermined interval of other IOCs or URLs), then the time to live 816, 828 may accompany the URL to ensure that it lapses if the predetermined interval passes without further IOCs. Conversely, when a URL includes a highly trusted reputation, this information may be retained by the device 802 for an extended period to avoid continued reporting to the threat management facility 806 for the highly trusted URLs. More generally, a time to live 816, 828 for various reputation scores 814, 826 may ensure that information that will remain relevant over time is retained at the device 802 while information that becomes less relevant or irrelevant with the passage of time is removed from the device 802. In one aspect, very popular and highly trusted URLs with high reputation scores 814, 826 have a longer time to live 816, 828 than the time to live 816, 828 associated with untrusted URLs with low reputation scores 814, 826 although other diagnostic patterns are also contemplated and may usefully be employed with a URL cache as contemplated herein.

The processor 818 may be configured to update the URL cache 810 on each device 802 using reputation scores 826 from the remote threat management facility 806 to add new entries for new URL traffic (e.g., received URLS 822) to the URL cache 810 and using the time to live 828 to expire existing entries from the URL cache 810. For example, to this end, the processor 818 may be configured to receive a web request 820 including a received URL 822. As described in more detail below, when the web request 820 is received, the received URL 822 may be compared to the URLs 812 in the URL cache 810 of the device 802. If the received URL 822 is in the URL cache 810 of the device 802, the system 800 may process the received URL 822 according to a corresponding reputation score 814 and time to live 816 in the URL cache 810. If the received URL 822 is not in the URL cache 810 of the device 802, the system 800 may communicate with the threat management facility 806, which includes URL data 824 including a plurality of reputation scores 826 and times to live 828 for a plurality of URLs. In particular, the system 800 may retrieve a reputation score 826 and a time to live 828 for the received URL 822 from the threat management facility 806. The system 800 may then store the reputation score 826 retrieved from the threat management facility 806 in the URL cache 810 for an amount of time equal to the time to live 828 retrieved from the threat management facility 806. All of the actions described above (e.g., comparing the received URL 822 to the URLs 812 in the URL cache 810 of the device 802, processing of the received URL 822, retrieving a reputation score 826 and a time to live 828 for the received URL 822, storing the reputation score 826, etc.) may be performed by the processor 818, another component of the device 802, or another component of the system 800.

The threat management facility 806 may be similar to any threat management facility described herein, e.g., a local or remote threat management facility, or the threat management facility 806 may instead be a third-party source of data. The threat management facility 806 may be configured to manage threats to an enterprise 804. The threat management facility 806 may be further configured to monitor the URL cache 810 of each of the devices 802 to detect a variance in one of the URL caches 810 relative to other URL caches.

Figure 9:
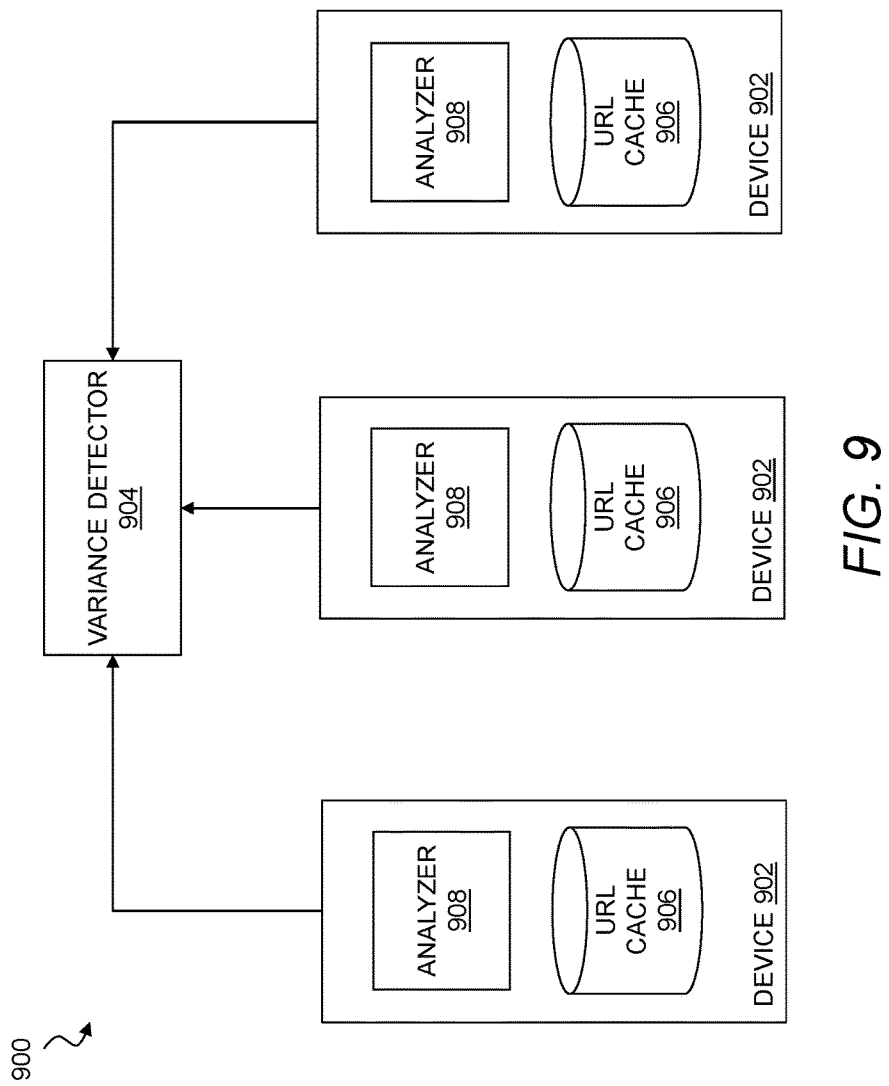
FIG. 9 illustrates a system for variance detection.

FIG. 9 illustrates a system for variance detection. The system may generally be configured to monitor a URL cache on each of a plurality of devices to detect a variance in one of the URL caches relative to each other one of the URL caches. Thus, the system may identify a variance between multiple devices that are carrying out similar tasks, such as multiple instances of virtual machines hosting web stores that are used to scale capacity. Using this system, potential attacks may be identified through monitoring and analyzing differences between the similar devices. In one aspect, a variance is identified by looking at the distribution of URL cache hits (and reputation of URLs visited) to identify significant differences between instances.

The system 900 may include a plurality of devices 902 that may be interconnected to a variance detector 904, e.g., through a network or the like (not shown).

The devices 902 may be any of the devices described herein (e.g., servers, endpoints, mobile devices, and so forth). This may, for example, include a farm of similarly configured servers for an e-commerce site or the like. In another aspect, this may include a number of identically-configured or similarly-configured tablets or other personal computing devices distributed to a group of corporate users or the like. Each device 902 may each include a URL cache 906 and an analyzer 908. The URL cache 906 may be any URL cache described herein or otherwise known in the art. The analyzer 908 may optionally be included on the device 902 or another component of the system 900, e.g., the analyzer 908 may be included on the variance detector 904, which may be located on a remote threat management facility for an enterprise, or some other remotely accessible location. The devices 902 may in general perform the same or similar function as each other device 902 in the system 900. While this is not required, it will tend to make the similarity or dissimilarity of URL caches across the devices 902 more relevant to threat detection.

The variance detector 904 may be local or remote to the devices 902. For example, the variance detector 904 may be executing on a threat management facility or the like of an enterprise associated with the device 902, or the variance detector 904 may be disposed outside of such an enterprise and operate, e.g., as a third-party service. In general, the variance detector 904 may detect a variance in behavior between devices 902. While emphasis here is on the use of behavior captured in URL caches, it will be appreciated that this may more broadly include any behavior that can be monitored on the devices 902 including without limitation data behavior, application or other executable behavior, network activity, and so forth, all as generally contemplated herein. In one aspect, this may include analyzing the differences between the URL traffic between each device 902; however other behaviors and metrics may be similarly monitored.

The variance detector 904 may be configured to monitor the URL cache 906 of each one of the devices 902 to detect a variance in one of the URL caches 906 relative to each other one of the URL caches 906. The variance detector 904 may receive information about the URL cache 906 from each device 902 (e.g., from the analyzer 908 of each device 902), and if there is a sufficient variation between one device 902 and the other devices 902, an alert may be raised. The alert may include, for example, the triggering of an IOC. A remedial action may also or instead be implemented in response to an alert, which may be initiated locally by the device 902, or remotely by a threat management facility or the like that receives the alert.

The variance may include, without limitation, a deviation in size of one of the URL caches 906, a deviation in average reputation of a URL, a deviation in average time to live for URLs in the cache, a presence of one or more unique URLs, a group of related URLs, and so forth. The variance may trigger an alert (e.g., an IOC), which may in turn trigger a remedial action for the device 902 storing the URL cache 906 that included the variance.

The analyzer 908 may locally analyze and process the URL traffic and more specifically the URL cache 906 of each device 902. The analyzer 908 may provide information to the variance detector 904 for use in detecting a variance between devices 902. In one aspect, the analyzer 908 periodically processes the contents of the URL cache 906 and sends a summary to the variance detector 904. The summary may be included in a report or IOC. The analysis performed by the analyzer 908 may include, without limitation, an analysis of the size of the URL cache 906, the average reputation of the URLs in the URL cache 906 (or a grouping or category of particular URLs in the URL cache 906), the average time to live of the URLs in the URL cache 906 (or a grouping or category of particular URLs in the URL cache 906), a reputation score or other quantifiable score based on any of the foregoing or combinations thereof, and so forth. To this end, the analyzer 908 may include an algorithm tailored to perform the particular analysis desired, which may be dependent on the purpose of the device 902.

The above systems of FIGS. 7-9 may in general periodically send (push or pull) local URL cache information from an endpoint, device, or client to a threat management facility, reputation service, third-party service, variance detector, or the like to detect possible threats to the system.

In general the above systems of FIGS. 7-9 may monitor behavioral events (in addition to IOCs) as they are detected, and identify any variance between the events of a plurality of servers/devices. An identified difference between behaviors of a specific server/device when compared to a plurality of servers/devices, even if that behavior is not an IOC itself, may indicate a change to the code and a potential compromise.

An example of the implementation of the systems of FIGS. 7-9 will now be discussed where an organization has multiple servers that provide access to a customer database. In order to scale demand, there may be a number of servers all handling queries via a network interface. Each server may connect to a database using a web services application programming interface (API) to the database. In this example, the only outbound connection from each of these servers may be to a specific web service. In this case, the URL cache may be small, and the reputation and time to live of that URL may quickly rise to the point where most entries would be expected to be cached for a long period of time. Also, all instances of this server may have the same URL cache profile. If one of the servers were to be compromised (e.g., an attacker attempted to extract data, and attempted to post it to a remote server), a new URL may be identified having a low reputation and a low time to live. This may then be passed on to a variance detector, and an alarm would be raised.

Other exemplary implementations may include embodiments on corporate network assets that are locked down to prevent changes in software configurations. In this context, particularly where there are explicit limits on network activity, the system can expect predictable web traffic and any substantial variations in the URL cache would be highly relevant to threat detection. Other examples may include other devices that are configured in a manner that does not allow a user to do anything new, and are only configured by an administrator or the like.

FIG. 10 is a flowchart of a method for threat detection using URL cache hits. The method 1000 may generally include a process for intercepting web traffic on a plurality of devices, where the reputation of each URL is checked for the device. The method 1000 may accomplish this by first checking a local URL cache, and if a requested URL is not in the URL cache then it is passed to a reputation service (e.g., a cloud-based reputation service) to identify (e.g., categorize) the URL and obtain a reputation score that includes a time to live. By way of example, a very popular and highly trusted website may return a very high reputation score (e.g., close to 100 out of 100 on a scale of 0-100) and a corresponding time to live (e.g., 48 hours). This result may be stored in the local URL cache so that subsequent lookups were not required until the time to live expired. URLs with a lower reputation (e.g., less popular URLs, unknown URLs, or URLs known to be hosting malicious or suspicious content) may have a much lower reputation score and time to live. While URL caches such as this may be generally known in the art, the following method describes a new use of URL caches where variations in the cache are monitored and used to detect potential threats. This approach may be particularly effective where metrics relating to time to live or reputation are included in the cache where they can be used to quantitatively characterize the aggregate URL cache.

As shown in step 1002, the method 1000 may include maintaining a URL cache on each of a plurality of devices. The URL cache may be stored and maintained on a memory of the device, where the URL cache may store a reputation score and a time to live for each of a plurality of URLs. The reputation score may depend on one or more of popularity, frequency of requests, historically determined trust, and so forth. The time to live may depend on reputation, or may be explicitly provided by a remote resource such as the URL intercept. The plurality of devices may include one or more of a web server, an endpoint, and a mobile device.

As shown in step 1004, the method 1000 may include updating the URL cache. In this manner, each URL cache on each device can remain current with network activity by that device. For example, when a web request including a URL is transmitted from a device, this may initially be compared to a URL cache to determine if there is any local information for the URL. If there is no local information, this information may be retrieved from a URL intercept as described above and stored in the URL cache along with any reputation information and time to live information for that URL.

As shown in step 1006, the method 1000 may include using the time to live to expire existing entries from the URL cache. In general, URLs in the URL cache will be expired, e.g., deleted from the cache, when they have been in the cache for at time equal to or greater than their time to live.

The foregoing steps generally describe use of a URL cache as contemplated herein. The information in this URL cache may, as noted above, be usefully exploited to detect possible threats on an endpoint.

As shown in step 1008, the method 1000 may include monitoring the URL cache of each one of the plurality of devices with the remote threat management facility to detect a variance in one of the URL caches relative to each other one of the URL caches. The variance may include without limitation a deviation in size of one of the URL caches, a deviation in average reputation, a deviation in average time to live, a presence of one or more unique URLs, and so forth. As noted above, this monitoring may be performed locally on an endpoint, remotely at a threat management facility, or some combination of these.

As shown in step 1010, the method 1000 may include responding to the variance with a remedial action for the device storing one of the URL caches. This may be any of the remedial actions contemplated herein including without limitation quarantine, shutdown, restart, or the like. The use of URL information is generally platform independent, depending instead on the remote network resource being accessed, and thus in one aspect this information may usefully be employed to general platform-independent IOC's.

As will be apparent to one of ordinary skill in the art, the various systems and methods described herein may be combined with one another.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
   configuring a plurality of servers in a group of similarly configured servers with one or more executables in a known configuration, each one of the plurality of servers configured to provide services across a network to remote clients;
   instrumenting each of the plurality of servers to detect changes in the one or more executables in the plurality of servers, and to periodically or continuously provide updates with information about the changes;
   receiving the changes in the one or more executables at a threat management facility for an enterprise network that includes the plurality of servers;
   detecting a drift in a first one of the plurality of servers, the drift including a deviation of the changes in the one or more executables in the first one of the plurality of servers relative to the changes in the one or more executables in other ones of the plurality of servers, wherein detecting includes detecting by a number of classes of changes each specifying an actor initiating one of the changes; and
   initiating a remedial action when the drift in the first one of the plurality of servers deviates beyond a predetermined threshold, wherein the predetermined threshold is a different threshold for each of the number of classes of changes.

2. The method of claim 1 wherein the actor is selected from a group consisting of an application, a user of the application, a passive authorized user, an active authorized user, and a trusted updater.

3. The method of claim 1 wherein the one or more executables include at least one of a native executable file, an interpreted file, a script, a dynamic linked library, and an Adobe flash file.

4. The method of claim 1 wherein the changes include updates to an application.

5. The method of claim 1 wherein the changes include installations of a new application.

6. The method of claim 1 wherein the changes include additions of at least one of a new dynamic linked library, a resource file, interpreted data file, and configuration file.

7. The method of claim 1 wherein the remedial action includes at least one of a quarantine, a deactivation, and a notification.

8. The method of claim 1 further comprising filtering at least one change initiated by a trusted updater.

9. A computer program product comprising non-transitory computer executable code embodied in a non-transitory computer readable medium that, when executing on one or more computing devices, performs the steps of:
   configuring a plurality of servers in a group of similarly configured servers with one or more executables in a known configuration, each one of the plurality of servers configured to provide services across a network to remote clients;

instrumenting each of the plurality of servers to detect changes in the one or more executables in the plurality of servers, and to periodically or continuously update a database with information about the changes;

receiving the changes in the one or more executables at a threat management facility for an enterprise network that includes the plurality of servers;

detecting a drift in a first one of the plurality of servers, the drift including a deviation of the changes in the one or more executables in the first one of the plurality of servers relative to the changes in the one or more executables in other ones of the plurality of servers, wherein detecting includes detecting by a number of classes of changes; and initiating a remedial action when the drift in the first one of the plurality of servers deviates beyond a predetermined threshold, wherein the predetermined threshold is a different threshold for each of the number of classes of changes.

10. The computer program product of claim 9 wherein the number of classes specify one or more actors.

11. The computer program product of claim 10 wherein the one or more actors are selected from a group consisting of an application, a user of the application, a passive authorized user, an active authorized user, and a trusted updater.

12. The computer program product of claim 9 wherein the one or more executables include at least one of a native executable file, an interpreted file, a script, a dynamic linked library, and an Adobe flash file.

13. The computer program product of claim 9 wherein the changes include updates to an application.

14. The computer program product of claim 9 wherein the changes include installations of a new application.

15. The computer program product of claim 9 wherein the changes include additions of at least one of a new dynamic linked library, a resource file, interpreted data file, and configuration file.

16. The computer program product of claim 9 further comprising filtering at least one change initiated by a trusted updater.

17. The computer program product of claim 9 wherein detecting includes detecting by a number of classes of changes, wherein the predetermined threshold is a different threshold for each of the number of classes.

18. The computer program product of claim 17 wherein the number of classes specify one or more actors initiating changes selected from a group consisting of an application, a user of the application, a passive authorized user, an active authorized user, and a trusted updater.

19. A system comprising:

a server farm including a plurality of similarly configured servers with one or more executables in a known configuration, each one of the plurality of servers configured to provide services across a network to remote clients, and each one of the plurality of servers including a processor and associated memory, the memory storing instructions which, when executed by the processor, detect a local drift including a change in the one or more executables on the server; and a threat management facility coupled in a communicating relationship with each one of the plurality of servers, the threat management facility including a processor and associated memory, the memory storing instructions which, when executed by the processor, monitor periodic or continuous updates of local drift corresponding to each one of the plurality of servers, to detect a deviation of the local drift in a first one of the plurality of servers relative to the local drift in other ones of the plurality of servers wherein detecting includes detecting by a number of classes of changes, and to initiate a remedial action when the deviation in the local drift in the first one of the plurality of servers exceeds a predetermined threshold, wherein the predetermined threshold is a different threshold for each of the number of classes of changes.

* * * * *